(12) United States Patent
Joern et al.

(10) Patent No.: US 9,937,996 B2
(45) Date of Patent: Apr. 10, 2018

(54) PASSENGER AIRCRAFT WITH AN EMERGENCY EXIT DOOR

(71) Applicant: Airbus Operations GmbH, Hamburg (DE)

(72) Inventors: Paul Joern, Hamburg (DE); Claus Hanske, Hamburg (DE); Arne Roth, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 260 days.

(21) Appl. No.: 14/711,906

(22) Filed: May 14, 2015

(65) Prior Publication Data

US 2015/0329194 A1    Nov. 19, 2015

(30) Foreign Application Priority Data

May 14, 2014    (DE) .................. 10 2014 106 831

(51) Int. Cl.
| | |
|---|---|
| *B64C 1/32* | (2006.01) |
| *B64C 1/14* | (2006.01) |
| *F42B 3/00* | (2006.01) |
| *F42B 15/36* | (2006.01) |
| *F16B 31/00* | (2006.01) |

(52) U.S. Cl.
CPC .............. *B64C 1/1423* (2013.01); *B64C 1/32* (2013.01); *F42B 3/006* (2013.01); *F16B 31/005* (2013.01); *F42B 15/36* (2013.01)

(58) Field of Classification Search
CPC ......... B64C 1/32; B64C 1/1423; B64C 1/143; B64C 1/1438; B64C 1/1461
See application file for complete search history.

(56) References Cited

U.S. PATENT DOCUMENTS 2,815,698 A * 12/1957 Burrows ............... F16B 31/005
                                            294/82.29
2,910,255 A    10/1959 Johnson
2,965,336 A * 12/1960 Lissarrague .............. B64C 1/32
                                            220/279

(Continued)

FOREIGN PATENT DOCUMENTS

| CN | 102285455 A | 12/2011 |
|---|---|---|
| DE | 694019 C | 7/1940 |

(Continued)

OTHER PUBLICATIONS

German Patent Office, German Search Report for European Patent Application No. 102014 106 831.9 dated Nov. 27, 2014.

(Continued)

*Primary Examiner* — Richard R Green
(74) *Attorney, Agent, or Firm* — Lorenz & Kopf, LLP

(57) ABSTRACT

A passenger aircraft with a passenger cabin is described, wherein the passenger aircraft comprises a fully functional door, which is openable and closable and which is adapted for an entrance and an exit of passengers, and en emergency exit door, which is exclusively adapted for an emergency exit of passengers from the passenger cabin. Therein, the emergency exit door is arranged in an area of a fuselage of the passenger aircraft, which is arranged ahead of and/or behind of wings of the passenger aircraft.

10 Claims, 27 Drawing Sheets

(56) References Cited

U.S. PATENT DOCUMENTS

| | | | |
|---|---|---|---|
| 3,486,410 A * | 12/1969 | Drexelius et al. | F42B 15/38 102/275.4 |
| 3,712,221 A | 1/1973 | Voigt, Jr. et al. | |
| 3,721,407 A | 3/1973 | Clarke | |
| 3,778,010 A | 12/1973 | Potts et al. | |
| 4,785,741 A | 11/1988 | Gronow | |
| 4,978,089 A | 12/1990 | Alquier et al. | |
| 6,364,404 B1 * | 4/2002 | De Paoli | B60J 1/006 296/201 |
| 2003/0127563 A1 | 7/2003 | LaConte | |
| 2013/0082141 A1 | 4/2013 | Koch et al. | |

FOREIGN PATENT DOCUMENTS

| | | |
|---|---|---|
| DE | 1071484 B | 12/1959 |
| DE | 3632122 C1 | 11/1987 |
| DE | 19951099 A1 | 6/2001 |
| DE | 10119315 C1 | 7/2002 |
| DE | 102007051802 A1 | 5/2009 |
| DE | 102009019434 A1 | 11/2010 |
| DE | 102011009481 A1 | 7/2012 |
| DE | 102011114643 A1 | 4/2013 |
| EP | 0433940 A1 | 6/1991 |
| JP | S4972000 U | 6/1974 |
| WO | 2012100985 A1 | 8/2012 |
| WO | 2013128219 A1 | 9/2013 |

OTHER PUBLICATIONS

European Patent Office, Extended European Search Report for Application No. 15167479.3-1754 dated Feb. 5, 2016.

Airbus Sas: "Airbus A321 : Aircraft Characteristics—Airport and Maintenance Planning, Typical Configuration Single-Class High Density Figure- 2-4-1", Jun. 1, 2012 (Jun. 1, 2012), XP055215359, Retrieved from the Internet: URL:http://skybrary.aero/bookshelf/books/2370.pdf [retrieved on Sep. 22, 2015].

* cited by examiner

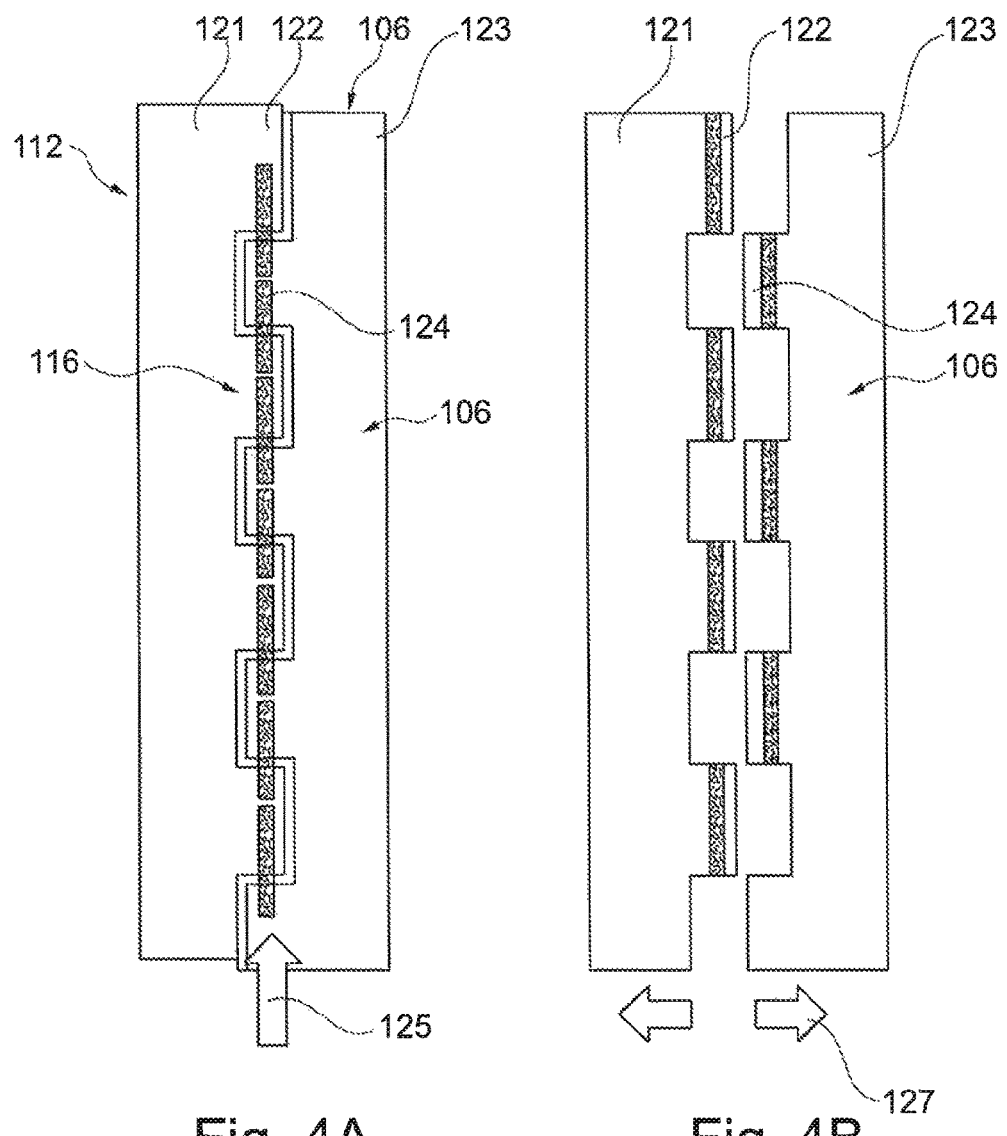

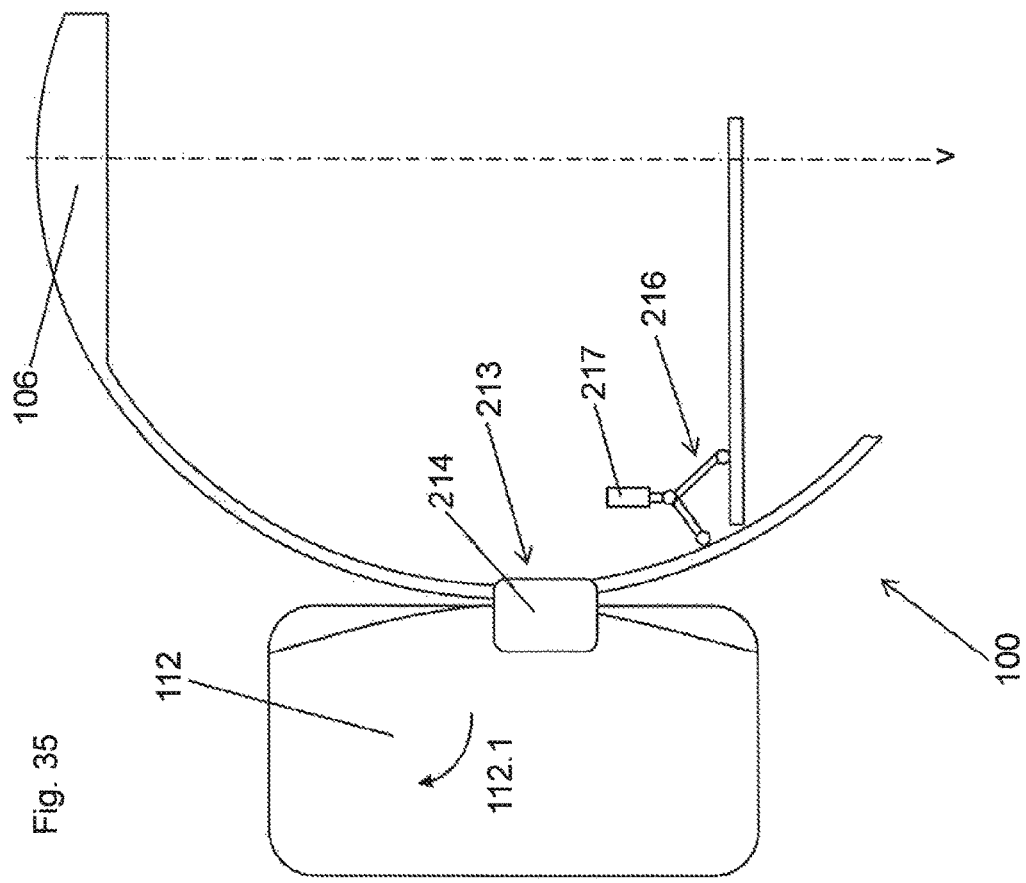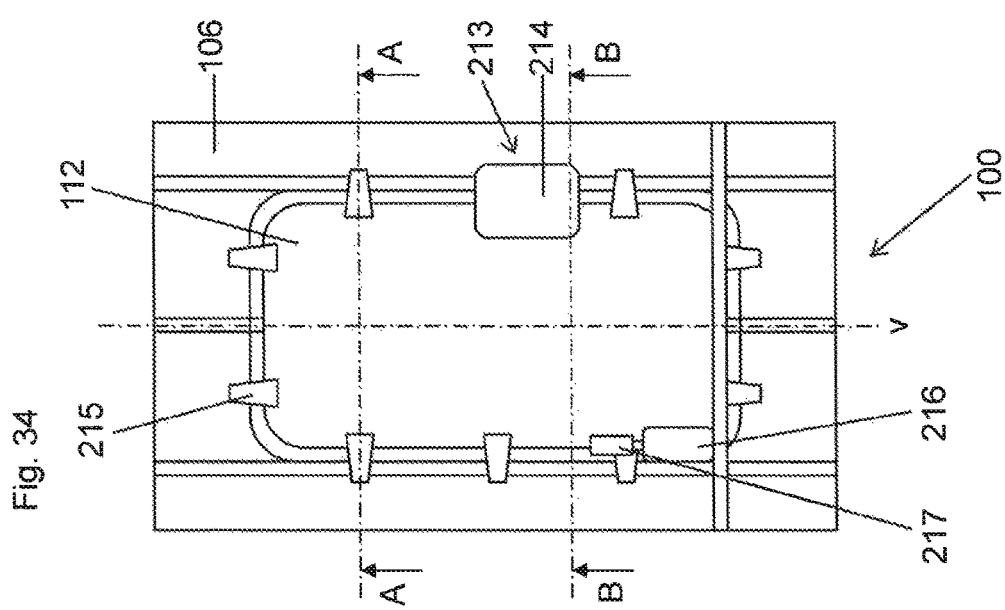

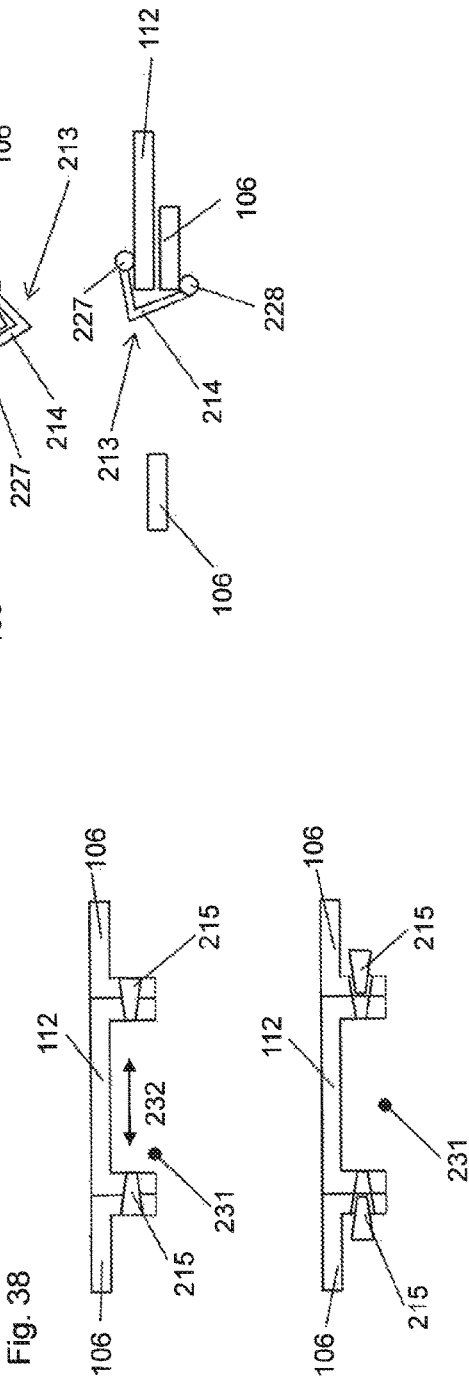

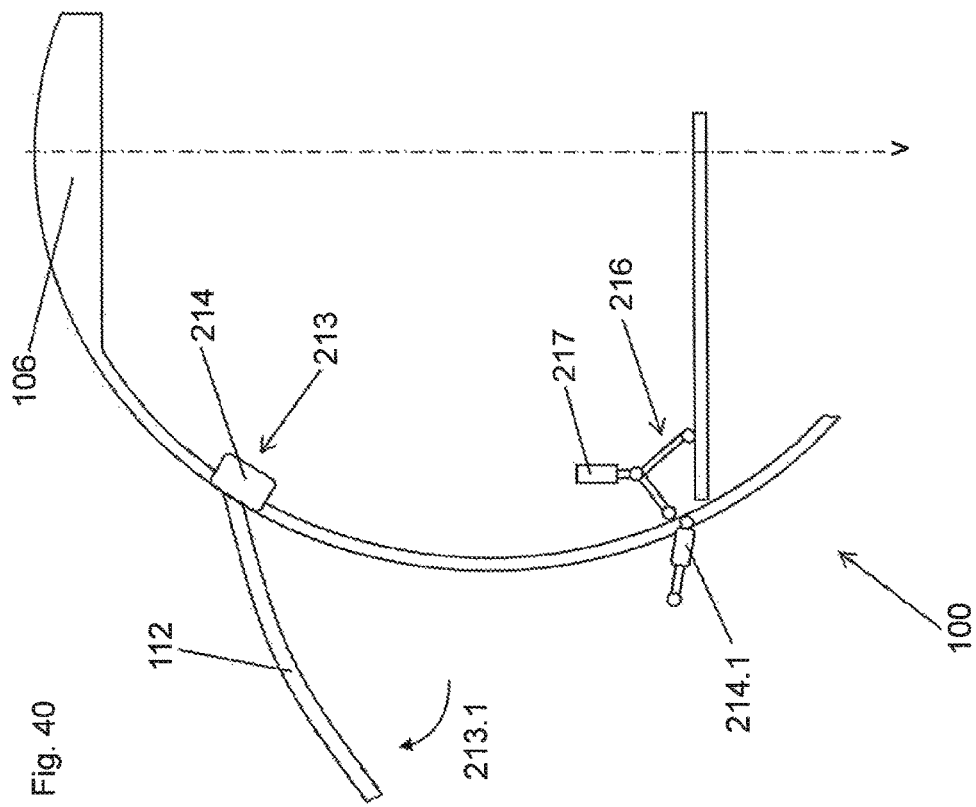
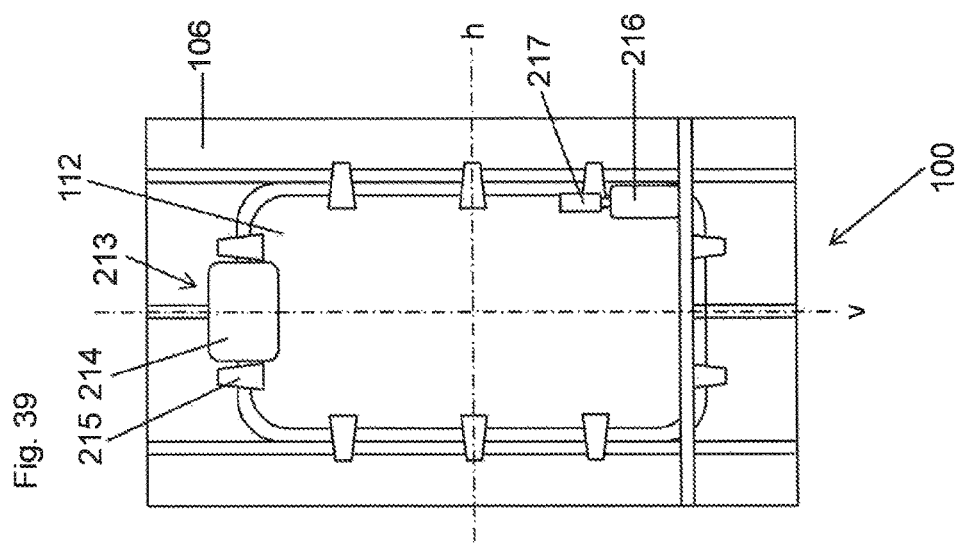

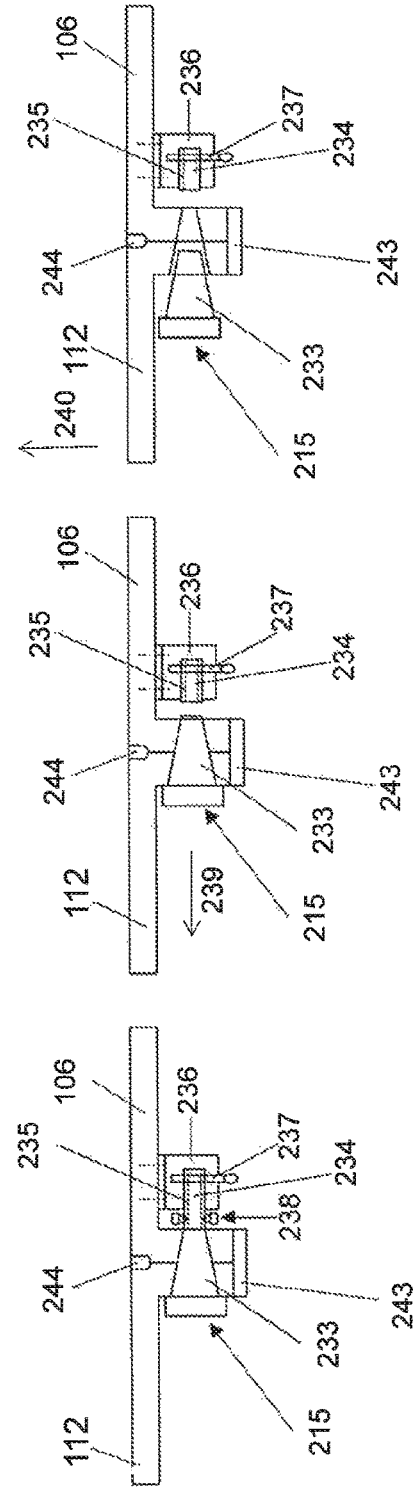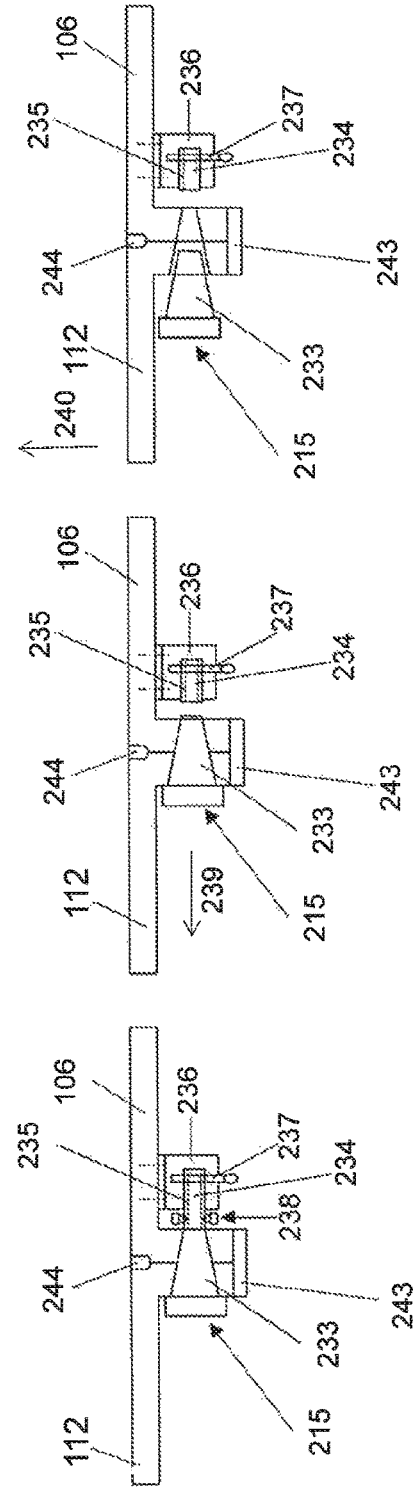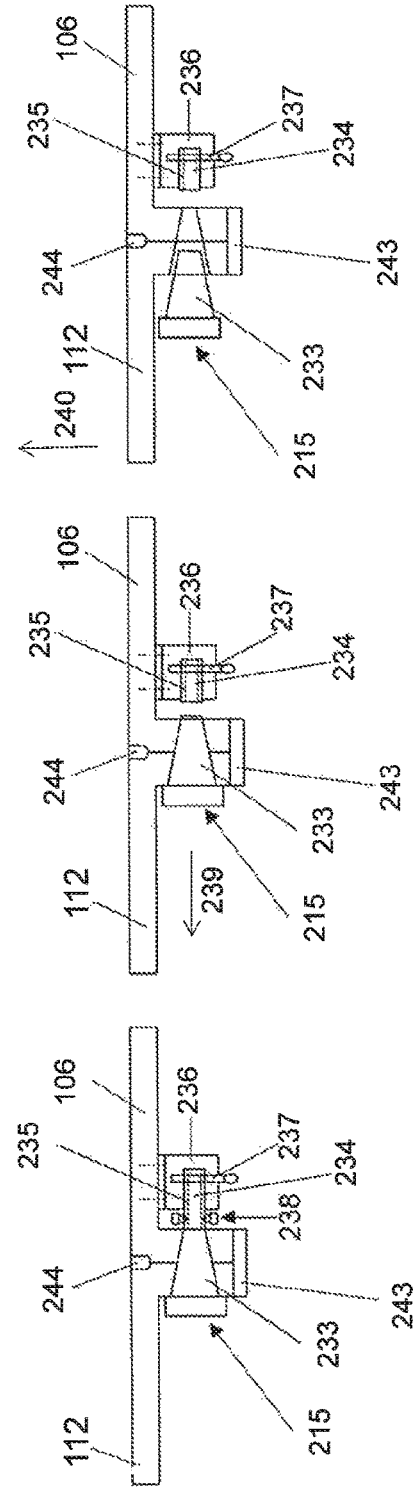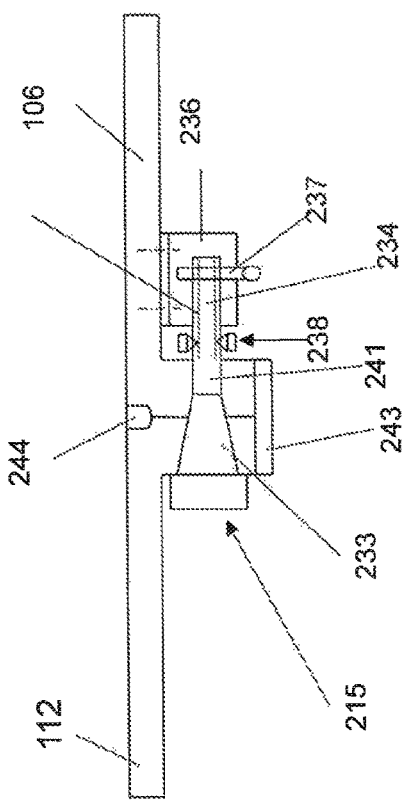

PASSENGER AIRCRAFT WITH AN EMERGENCY EXIT DOOR

CROSS-REFERENCE TO RELATED APPLICATION

This application claims priority to German Patent Application No. 10 2014 106 831.9, filed 14 May 2014, which is incorporated herein by reference in its entirety.

TECHNICAL FIELD

The embodiment relates to a passenger aircraft with at least one emergency exit door that is designed exclusively for the exit of passengers in the case of evacuation.

BACKGROUND

To ensure fast evacuation of passengers of a passenger aircraft, for example following an emergency landing, as a rule passenger aircraft comprise several doors arranged in an external skin of the passenger aircraft. Such doors can also be used for regular entry and exit of passengers and, for example, for loading and unloading supplies and/or consumables (catering). In order to accelerate the evacuation of all passengers in the case of evacuation, it is also possible for emergency exit hatches to be provided in a region of the wings of the passenger aircraft.

WO 2012 100 985 A1 and DE 10 2011 009 481 A1 describe a door arrangement for a vehicle, in particular for an aircraft. The door arrangement comprises two door leaves that are opened so that a maximum opening angle between them is delimited.

In addition, other objects, desirable features and characteristics will become apparent from the subsequent summary and detailed description, and the appended claims, taken in conjunction with the accompanying drawings and this background.

SUMMARY

One aspect of the embodiment relates to a passenger aircraft comprising a fully functional door that is openable and closeable and that is designed for the entry and exit of passengers. Furthermore, the passenger aircraft comprises an emergency exit door that is designed exclusively for the emergency exit of passengers from the passenger cabin. The emergency exit door is arranged in a region of an external skin of the passenger aircraft, which region is arranged forward or aft of wings of the passenger aircraft.

The fully functional door, too, can be arranged forward or aft of the wings. In this context the term "forward or aft of the wings" can denote that in the direction of longitudinal extension of the passenger aircraft the emergency exit door and the fully functional door are arranged in front of or behind the wings in the external skin. In other words, the doors are not arranged above the wings or airfoils in the fuselage or in the external skin of the passenger aircraft, and, consequently, passengers that use the doors as an emergency exit do not have to step on the wing.

In the context of the present embodiment the term "fully functional door" can mean that the door can repeatedly be opened and closed as well as locked and unlocked, and consequently the door can be used, for example, for the entry and exit of passengers into and from the passenger aircraft and for loading and unloading the passenger aircraft, for example with consumables and/or supplies (catering). The term "fully functional door" can thus refer to a conventional door for an aircraft, which door can comprise further components, for example a cabin internal pressure warning device and/or a device for displaying the state of an emergency slide. In contrast to this, the emergency exit door is exclusively designed to be opened, for example in the case of evacuation or in the case of an emergency, for passengers to be able to quickly leave the passenger aircraft also by way of the emergency exit door. As is the case with the fully functional door, the emergency exit door can, however, also comprise further components and/or devices, for example a locking device for locking and unlocking, and/or various warning devices.

The emergency exit door, which is designed or useable exclusively as an emergency exit, can advantageously make it possible to design the kinematics and/or mechanics of the emergency exit door, for example of a closing device and/or locking device, in a simplified manner when compared to a fully functional door. Moreover, integration of the emergency exit door in the external skin, for example a door frame and/or a region of the external skin, which region adjoins the emergency exit door, can be implemented so as to be simplified. This can also improve the robustness of the integration. By providing an emergency exit door instead of a further fully functional door it is thus possible to reduce the overall weight of the passenger aircraft, for example by being able to do without some structural components of the emergency exit door and/or of the door frame, wherein nevertheless safety directives for evacuation can be complied with. Furthermore, it is possible to do away with the monitoring of a state of the emergency exit door, which can result in further weight savings. Moreover, due to a simplified design or a simplified construction, costs of producing the emergency exit door can be reduced. In particular, it can be provided for the emergency exit door, because of the different requirements, overall to be of a more lightweight design than the fully functional door. For example, it can be provided for the emergency exit door not to comprise an emergency slide system.

According to one embodiment, the passenger aircraft comprises at least two emergency exit doors and/or at least two fully functional doors. The two emergency exit doors can be arranged forward and/or aft of wings of the passenger aircraft.

This can advantageously reduce the time required for evacuating passengers from the passenger aircraft. In each case an emergency exit door and a fully functional door can be arranged on a side of the passenger aircraft. Moreover, the two emergency exit doors can be arranged on one side, and the two fully functional doors can be arranged on a further side.

According to a further embodiment, the at least two emergency exit doors are both arranged in an aft region of the passenger aircraft, and the at least two fully functional doors are both arranged in a forward region of the passenger aircraft.

According to a further embodiment, the passenger aircraft comprises four emergency exit doors, wherein in each case two of them are arranged in a region of the passenger aircraft forward and aft of a wing of the passenger aircraft. Furthermore, the passenger aircraft comprises four fully functional doors, of which in each case two are arranged in an aft region and two in a forward region of the passenger aircraft.

According to a further embodiment, the emergency exit door is designed to be load bearing. Consequently, in an advantageous manner a structure of the passenger aircraft, which structure surrounds the emergency exit door or adjoins the exit door, can be of a simplified and thus weight-reducing design. Moreover, the load distribution between the emergency exit door and the external skin can be improved, and thus a homogeneous load distribution in the region of the emergency exit door can be achieved. This in turn can reduce maintenance work and maintenance expenditure, and can improve the robustness of the passenger aircraft.

According to one embodiment, the emergency exit door is reversibly openable. In other words, the emergency exit door can be opened and/or closed in a non-destructive manner, wherein the term "non-destructive" can mean without destruction and/or deformation of components of the emergency exit door and/or of adjoining structural aircraft components. Consequently, after use of the emergency exit door for evacuation of the passenger aircraft, the emergency exit door can be used again without any additional repair or maintenance work.

According to one embodiment the emergency exit door comprises at least one locking device that is designed to detachably affix the emergency exit door to the external skin of the passenger aircraft. The locking device can, for example, comprise a closing device, a hinge locking device, a bolt locking device, a spring locking device, a pressure locking device or some other suitable device that can be designed to reliably lock and unlock, and to close and open, the emergency exit door. Generally speaking, the locking device can be a mechanical, an electrical, an electromechanical, and/or an electronic locking device.

According to one embodiment, the emergency exit door is detachably affixed with positive-locking fit in the external skin of the passenger aircraft. For example in terms of its geometry, the emergency exit door can be designed to be cooperating in such a manner with an emergency exit opening or a recess in the external skin that, for example by being slid in one spatial direction, it can be removed from the recess and can be reinserted in the recess.

According to one embodiment, the emergency exit door is connected to the external skin of the passenger aircraft by means of an integral connection, wherein the emergency exit door is openable in that the integral connection is disconnected. For example, the emergency exit door can be bonded and/or welded to the external skin. The integral connection can, for example, be designed to be punctual between a boundary of the emergency exit door and the external skin and/or at least partly circumferential on the emergency exit door.

According to a further embodiment, the emergency exit door comprises at least one hinge, wherein by means of the hinge, the emergency exit door is designed to be hingeable. In other words, the emergency exit door can be hinged open. Moreover, the emergency exit door can, for example, be designed to be segmented and can be foldable into itself or foldable together.

According to one embodiment, the emergency exit door is designed to be slidable. For example, the emergency exit door can be accommodated in or suspended from and/or guided in a guide rail so that it can be slidable for closing and opening.

According to one embodiment, the emergency exit door is openable as a result of the destruction and/or deformation of at least part of a region of the emergency exit door, and/or of a region of the external skin, which region adjoins the emergency exit door. In other words, the emergency exit door can be designed to be irreversibly openable so that after the emergency exit door has been opened at least part of the emergency exit door and/or of the adjoining region needs to be replaced and/or serviced.

According to one embodiment, for the purpose of being opened, the emergency exit door is separable from the external skin by breaking a predetermined breaking point on the emergency exit door and/or on a region of the external skin, which region adjoins the emergency exit door.

According to a further embodiment, the emergency exit door is separable from the external skin by means of a separator element that is at least partly circumferential on the emergency exit door. The separator element can, for example, be a hose and/or wire that is at least partly integrated, for example laminated in or bonded in, in the external skin and/or in the emergency exit door. The separator element can thus separate, for example by means of inflation, pressure reduction, and/or heating, a connection between the emergency exit door and the external skin so that the emergency exit door can be opened.

According to a further embodiment, the emergency exit door is at least partly connected to the external skin by means of an integral connection, wherein for opening the emergency exit door the integral connection is, at least partly, irreversibly destroyable. The integral connection can be separable, for example by heating, cooling, ultrasound, radiation and/or by mechanical oscillation (vibration).

According to a further embodiment, in the fuselage or in the external skin of the passenger aircraft an access hatch can be provided that is designed neither for regular entry and exit of passengers nor for an emergency exit, but instead is designed exclusively for maintenance work and for loading and unloading the aircraft with consumables and supplies. The access hatch can be designed in such a manner that it is openable exclusively from the outside by ground personnel, for example with the use of a special tool such as a pneumatic screwdriver. In this manner the access hatch can be designed so that it is weight saving, economical, load bearing, reliable and robust.

The emergency exit door can further be locked in press fit by bolts which comprise a conic part, wherein the bolts frame a door cutout of the emergency exit door. The bolts can be pressed into a corresponding part of the fuselage and/or the emergency exit door and enable a shear-load transfer, in particular an outwardly orientated force as a result of the shear forces, of the emergency exit door. The conical part of the bolts enables to reduce the risk of jamming in the case of opening the emergency exit door. For unlocking and opening of the emergency exit door, the bolts can be extracted out of their press fits, if the fuselage of the aircraft is de-pressurized. To enable its opening the emergency exit door preferably comprises at least one hinge which can be most beneficial arranged at the side of the emergency exit door. The emergency exit door can further be assembled in a medium fit by which small deformations lead to an even more load-carrying characteristic of the emergency exit door.

Preferably, the bolts are screwed into nuts, e.g. rivet nuts or anchor nuts. This principle enables a pre-tension of the bolts and prevents a slip-out of the bolts in case of vibrations.

The emergency exit door can further comprise at least one explosive charge, e.g. a pyro charge or a detonating cord, which is adapted for destroying the bolts or the nuts each at a predetermined braking point. Such an explosive charge facilitates an extraction of the bolts and an unlocking of the emergency exit door.

Furthermore, the emergency exit door can comprise at least two independent explosive charges at independent ignition circuits. Each of the explosive charges can fulfill the function of destroying the bolts. This enables an extremely high opening reliability of the emergency exit door in case that one of the circuits fails or is not operating properly. A failure of destruction of at least one of the bolts leads to the problem that the emergency exit door cannot be opened which today is judged "catastrophic".

In case of an inadvertent destruction of bolts during normal flight conditions the emergency exit door still cannot be opened, if an internal cabin pressure is still working because this pressure forces the bolts to remain in their press fits. An internal extraction of the bolts, even if they are destroyed, is not possible, if the internal cabin pressure is still working. To solve this problem in a further embodiment, the bolts comprise a non-conic form-fit part which can provide further safety if necessary.

The ignition of the explosive charge can be secured by controlling it via a barometric control. In case of insufficient reliability, this system can also be redundant.

Another embodiment can comprise a mechanism that is adapted for pulling the bolts out of their press fits and e.g. inside of the emergency exit door. This facilitates the extraction of the bolts out of their press fits.

The mechanism can comprise an amplified device, e.g. a hydraulic device, which is adapted for supporting the pulling of the bolts inside of the emergency exit door or for opening the emergency exit door. Thereby, an opening, especially a beginning of an opening, of the emergency exit door is supported. This especially enables an opening of the door even in case of deformed shells.

The emergency exit door can further comprise a rubber lip with a circumferential profile which is adapted for providing inner pressure tightness of the emergency exit door.

Finally, the passenger aircraft can comprise a silicone sealant which is arranged between two adjacent outer surfaces of the emergency exit door and the external skin. Such a simple sealant from the outside can reliably prevent water ingress and assures aerodynamic smoothness. Further, performance benefits can be achieved by reducing drag.

Below, exemplary embodiments are described in detail with reference to the enclosed figures.

BRIEF DESCRIPTION OF THE DRAWINGS

The various embodiments will hereinafter be described in conjunction with the following drawing figures, wherein like numerals denote like elements, and:

FIG. 4A shows a locking device of an emergency exit door for a passenger aircraft according to an exemplary embodiment.

FIG. 4B shows a locking device of an emergency exit door for a passenger aircraft according to an exemplary embodiment.

FIG. 34 shows an emergency exit door lockable by conical bolts for a passenger aircraft according to an exemplary embodiment.

FIG. 35 shows an emergency exit door lockable by conical bolts for a passenger aircraft according to a further exemplary embodiment.

FIG. 36 shows an emergency exit door lockable by conical bolts for a passenger aircraft according to a further exemplary embodiment.

FIG. 37 shows an emergency exit door lockable by conical bolts for a passenger aircraft according to a further exemplary embodiment.

FIG. 38 shows an alternative arrangement of conical bolts for an emergency exit door lockable by conical bolts for a passenger aircraft according to a further exemplary embodiment.

FIG. 39 show another emergency exit door lockable by conical bolts for a passenger aircraft according to an exemplary embodiment.

FIG. 40 shows another emergency exit door lockable by conical bolts for a passenger aircraft according to a further exemplary embodiment.

FIG. 41 shows an enlarged view of detail Z of FIG. 36 with one of the conical bolts and other elements of the emergency exit door as per FIGS. 34 to 37.

FIG. 42 shows an enlarged view of detail Z of FIG. 36 with one of the conical bolts and other elements of the emergency exit door as per FIGS. 34 to 37.

FIG. 43 shows an enlarged view of detail Z of FIG. 36 with one of the conical bolts and other elements of the emergency exit door as per FIGS. 34 to 37.

FIG. 44 shows alternative conical bolts and other elements for the emergency exit door as per FIGS. 34 to 37.

Basically, identical or similar components have the same reference characters. The illustrations in the figures are merely diagrammatic and not to scale.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1A:
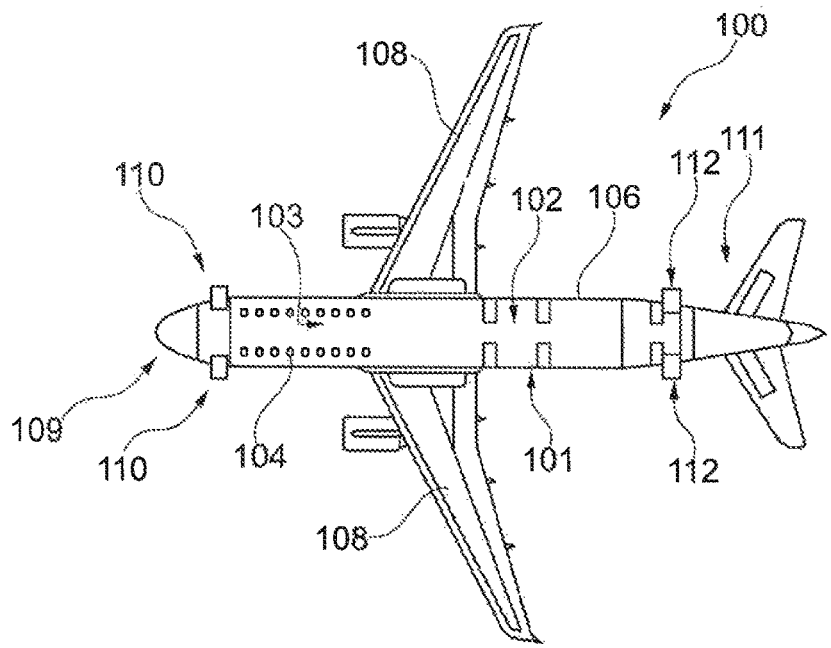
FIG. 1A shows a passenger aircraft according to an exemplary embodiment.
Figure 1B:
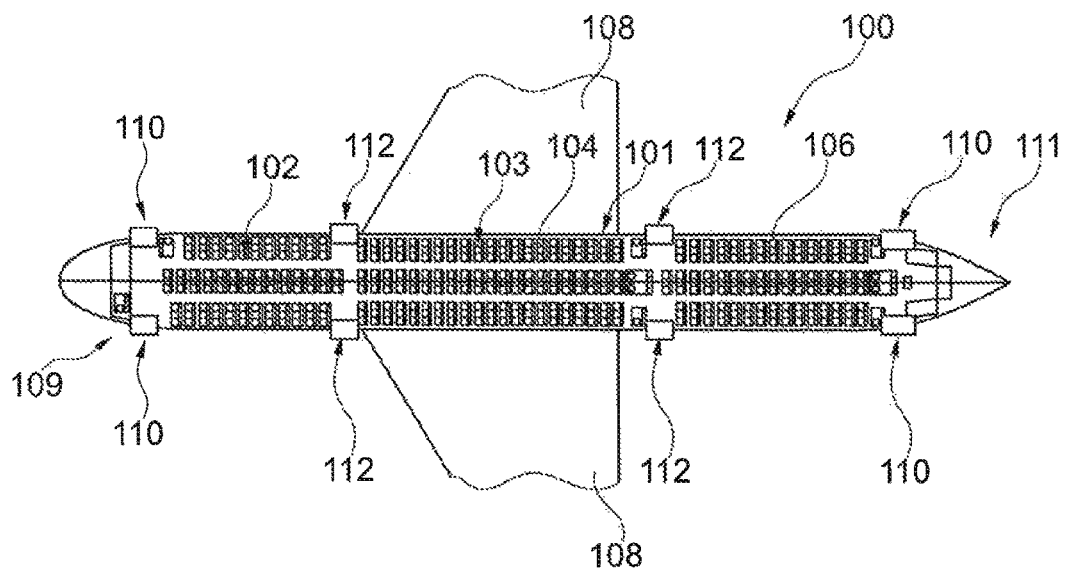
FIG. 1B shows a passenger aircraft according to an exemplary embodiment.

FIGS. 1A and 1B each shows a passenger aircraft 100 according to exemplary embodiments.

The passenger aircraft 100 of FIG. 1A comprises an aircraft fuselage 101 with a passenger cabin 102 in which several seat rows 103, arranged one behind the other and one beside the other, with passenger seats 104 are arranged. Furthermore, the passenger aircraft 100 comprises two longitudinal aisles, in other words a so-called double-aisle configuration.

Furthermore, on an external skin 106 of the passenger aircraft 100 on each side of the passenger aircraft 100 a wing 108 is arranged.

Furthermore, in a forward region 109 the passenger aircraft 100 of FIG. 1A comprises two fully functional doors 110, wherein in each case one door 110 is arranged on each side of the passenger aircraft 100. In this design the fully functional doors 110 are openable and closeable and designed for entry into and exit from the passenger aircraft 100.

Furthermore, in an aft region 111 the passenger aircraft 100 comprises two emergency exit doors 112, wherein in each case one emergency exit door 112 is arranged on each side of the passenger aircraft 100. In this design the emergency exit doors 112 are exclusively designed for emergency exit of passengers in the case of evacuation. The emergency exit doors 112 are not situated in a region of the external skin 106, in which region the wings 108 are attached to the external skin 106.

In the case of evacuation, the passengers located in the passenger aircraft 100 can leave the passenger aircraft 100 on both its sides by way of the two fully functional doors 110 and by way of the two emergency exit doors 112. To this effect an emergency slide can be provided or arranged on each door 110 and on each emergency exit door 112, which emergency slide can comprise a fold-out design, and by way that emergency slide the passengers can leave the passenger aircraft 100 and slide to the ground.

In contrast to the above, the passenger aircraft 100 shown in FIG. 1B comprises four emergency exit doors 112, with two of them being arranged forward, and two aft of the wings 108, i.e. when viewed in the longitudinal extension of the passenger aircraft 100 two of the emergency exit doors 112 are arranged in front of the wings 108, and two are arranged behind the wings 108. Furthermore, in each case two of the emergency exit doors 112 are arranged on each side of the passenger aircraft 100 so that in each case one emergency exit door 112 is arranged forward of a leading edge of each wing 108 and in each case an emergency exit door 112 is arranged behind a trailing edge of each wing 108.

Furthermore, the passenger aircraft 100 of FIG. 1B comprises four fully functional doors 110, that in each case two are arranged in the aft region 111 and two in the forward region 109. Furthermore, in each case two of the doors 110 are arranged on each side of the passenger aircraft 100.

Figure 2:
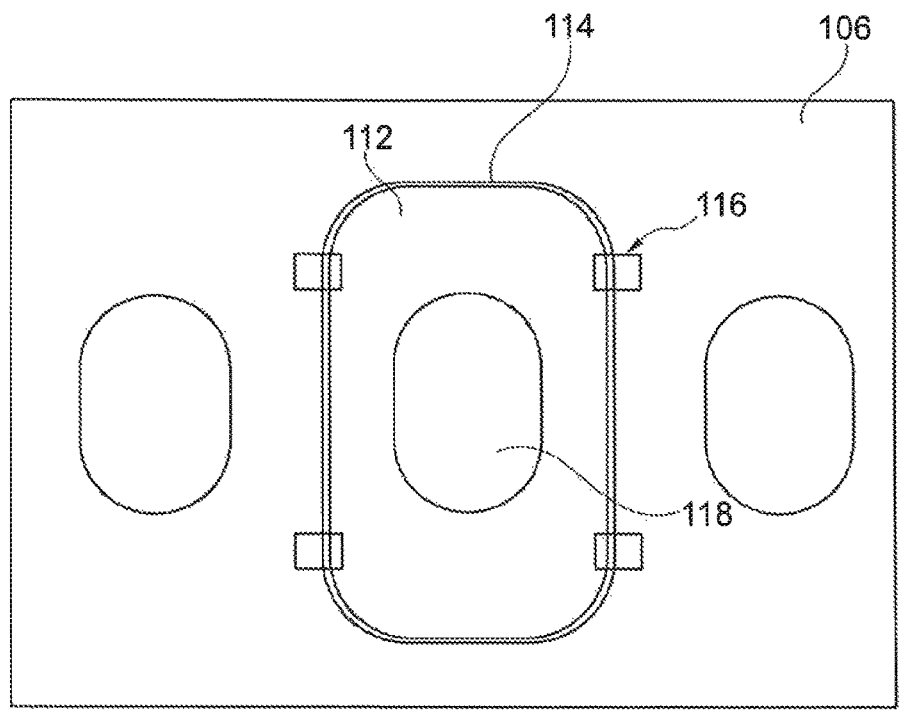
FIG. 2 shows an emergency exit door for a passenger aircraft an exemplary embodiment.

FIG. 2 shows an emergency exit door 112 for a passenger aircraft 100 according to one exemplary embodiment. In the diagram the emergency exit door 112 is shown from the interior of the passenger aircraft 100.

The emergency exit door 112 is accommodated in a recess 114 of the external skin 106 or is locked in the recess 114.

Moreover, the emergency exit door 112 comprises locking devices 116, wherein on each lateral boundary of the emergency exit door 112 a locking device 116 is arranged.

For this purpose each of the locking devices 116 can, for example, comprise a latching device which by means of a cooperating further latching component, which can be attached to the external skin 106, for example can be latched in a positive-locking and/or non-positive locking manner. For example, the locking devices 116 can in each case comprise a bolt that can be accommodated in an accommodation device of the latching component.

Furthermore, a window 118 is arranged in the emergency exit door 112.

Figure 3:
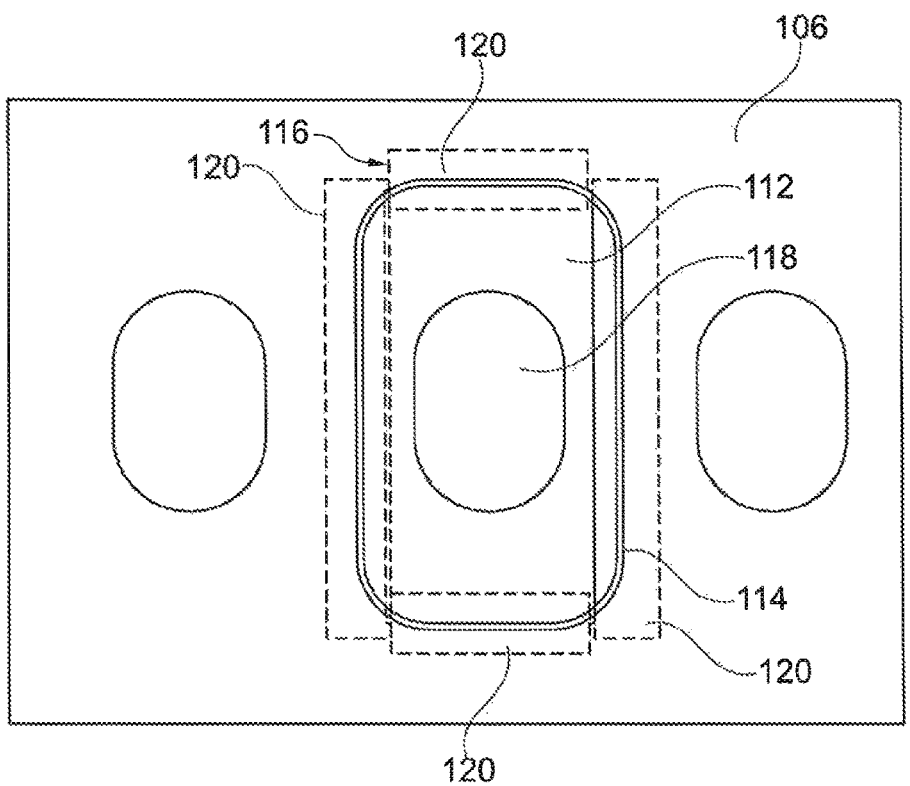
FIG. 3 shows an emergency exit door for a passenger aircraft an exemplary embodiment.

FIG. 3 shows an emergency exit door 112 for a passenger aircraft 100 according to a further exemplary embodiment. The locking device 116 of the emergency exit door 112 comprises a total of four covers 120, which respectively cover a right-hand side, a left-hand side, a top and a bottom boundary of the emergency exit door 112. The covers 120 thus cover a door gap that potentially exists between the boundaries and the external skin 106. The covers 120 can moreover be attached, for example clipped and/or locked, for example to the emergency exit door 112 and to the external skin. Furthermore, the covers 120 can be integrated in the external skin 106 and/or in the emergency exit door 112. For opening the emergency exit door 112 the covers 120 can be designed to be removable. Furthermore, the covers 120 can be removed from the external skin 106 and/or from the emergency exit door 112, for example by cutting action.

FIGS. 4A and 4B each shows a locking device 116, formed in a boundary region 121, of an emergency exit door 112 for a passenger aircraft 100 according to one exemplary embodiment. The boundary region 121 comprises an indentation arrangement with cuboid indentations 122, which indentation arrangement is designed to cooperate with a region 123 of the external skin 106, which region 123 adjoins the emergency exit door 112. The region 123 of the external skin 106 thus also comprises an indentation arrangement with cuboid indentations 124.

In the closed state of the emergency exit door 112 the indentations 122 of the boundary region 121 mesh in the manner of piano keys between respective two adjacent indentations 124 of the region 123, wherein the indentations 122 and 124 can overlap in part.

For the purpose of opening the emergency exit door 112 the latter can be designed to be slidable in the vertical direction, as indicated by arrow 125 in FIG. 4A. Furthermore, for final detachment from the external skin 106 the emergency exit door 112 can be slid laterally. This is indicated in FIG. 4B by means of the arrows 127. Analogously, a closing procedure of the emergency exit door 112 can be carried out in the lateral and/or vertical direction.

Figure 5A:
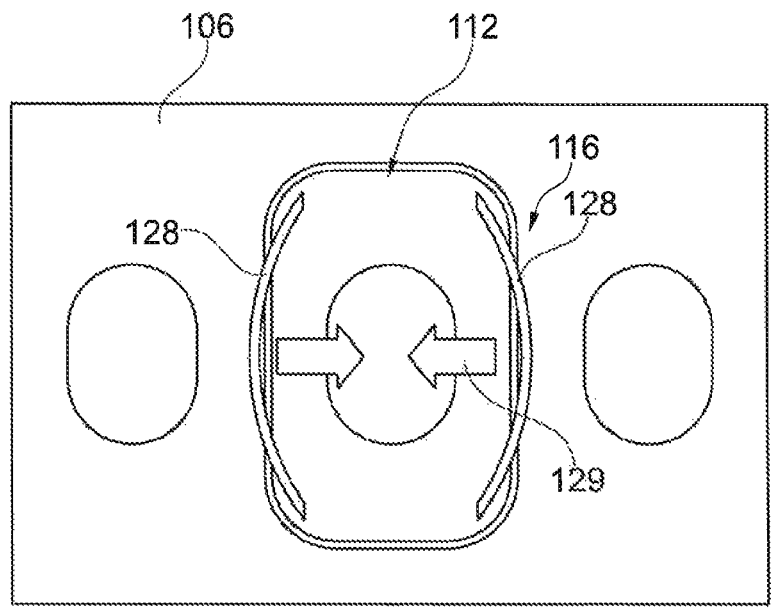
FIG. 5A show an emergency exit door for a passenger aircraft according to an exemplary embodiment.
Figure 5B:
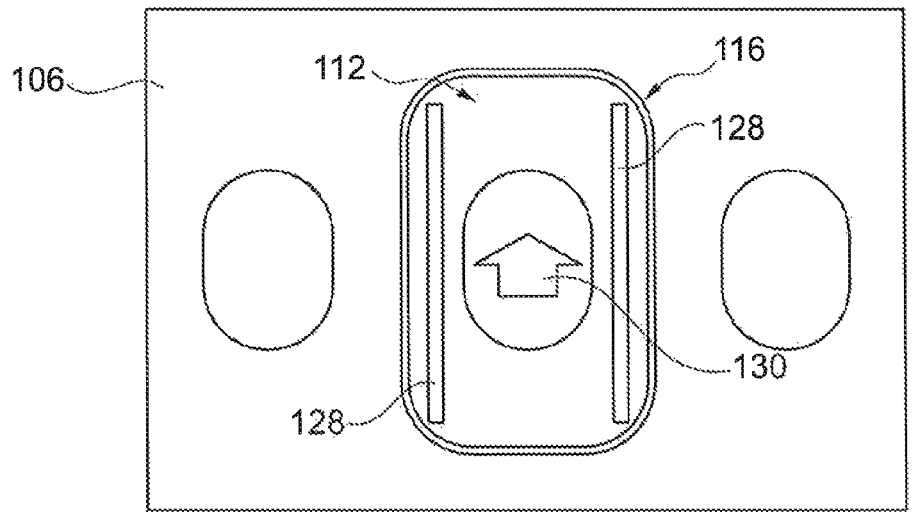
FIG. 5B shows an emergency exit door for a passenger aircraft according to an exemplary embodiment.

FIGS. 5A and 5B show an emergency exit door 112 for a passenger aircraft 100 according to a further exemplary embodiment. In FIG. 5A the locking device 116 is shown in a locked state. To this effect the locking device 116 comprises two deformable spring elements 128 that along two longitudinal edges of the emergency exit door 112 extend in the vertical direction and when the emergency exit door 112 is locked partly project into an adjacent region of the external skin 106.

For the purpose of opening the emergency exit door 112 the spring elements 128 can be bent in the direction of the emergency exit door 112 so that they extend essentially vertically and parallel to the longitudinal edges. In FIG. 5A this is indicated by the arrows 129. For final detachment of the emergency exit door 112 from the external skin 106 it can subsequently be pressed outwards as indicated in FIG. 5B by means of the arrow 130.

Figure 6A:
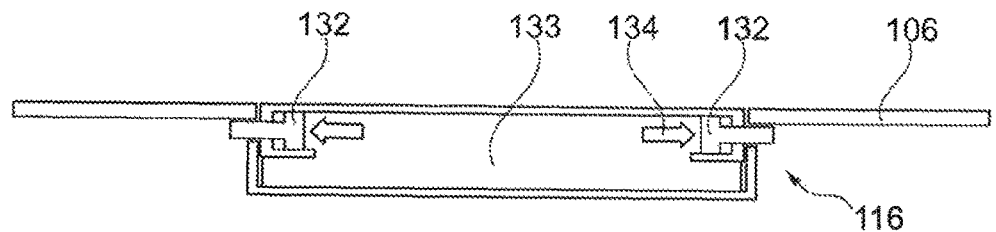
FIG. 6A shows a section of an emergency exit door for a passenger aircraft according to an exemplary embodiment.
Figure 6B:
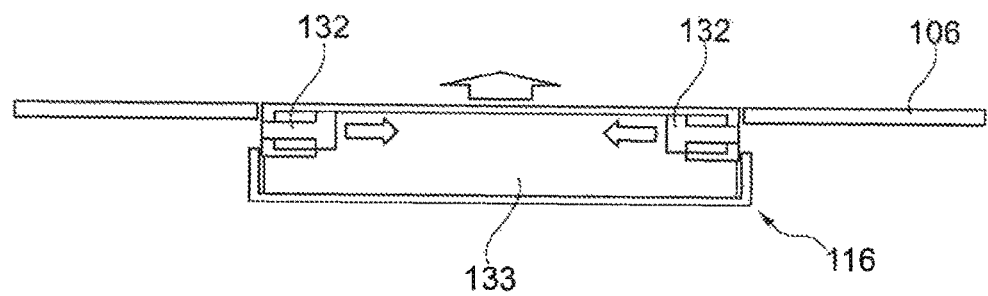
FIG. 6B shows a section of an emergency exit door for a passenger aircraft according to an exemplary embodiment.

FIGS. 6A and 6B each shows a section of an emergency exit door 112 along a horizontal median plane of the emergency exit door 112. The locking device 116 comprises several locking bolts 132 that in the locked state rest on the inside against the external skin 106 and detachably affix the emergency exit door 112 in a manner shown in FIG. 6A. For the actual locking action, an interior volume 133 of the emergency exit door 112 can be pressurized so that as a result of the pressure the locking bolts 132 are at least partly pushed from the interior volume 133 in the direction of the external skin 106. This is indicated in FIG. 6A by means of the arrows 134.

For the purpose of unlocking and opening the emergency exit door 112 the pressure can be released from the interior volume 133, for example by means of a valve, so that the locking bolts 132 can be pushed in the direction of the interior volume 133.

Figure 7:
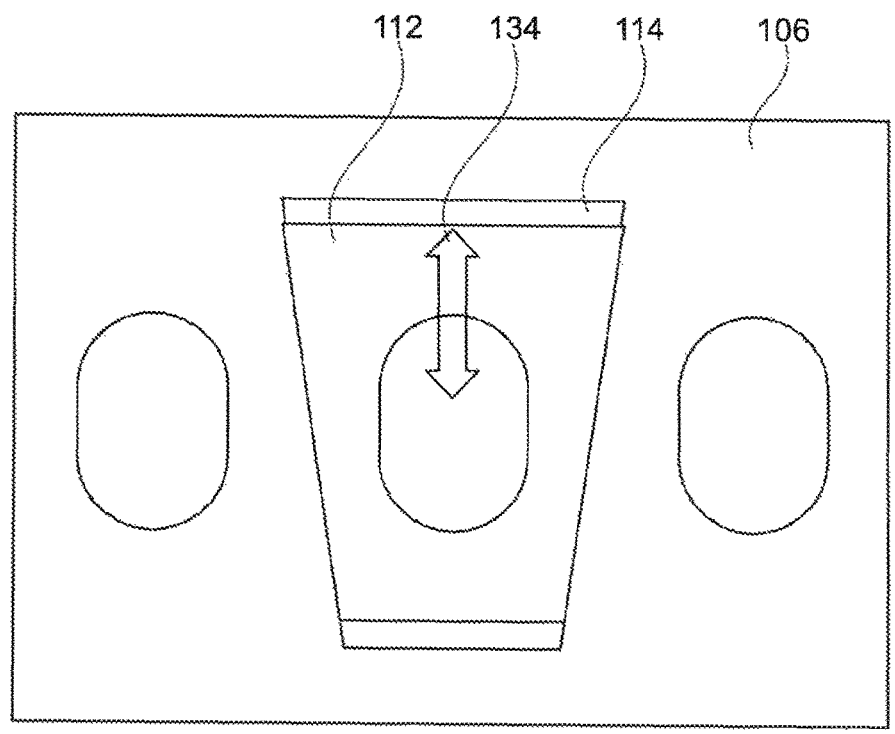
FIG. 7 shows an emergency exit door for a passenger aircraft according to a further exemplary embodiment.

FIG. 7 shows an emergency exit door 112 for a passenger aircraft 100 according to a further exemplary embodiment. In this embodiment the emergency exit door 112 comprises a V-shaped design and is lockable in a corresponding recess 114 (emergency exit), which also comprises a V-shaped design, in the external skin 106 by positive-locking fit and/or non positive-locking fit. In addition, the emergency exit door 112 and the recess 114 can be designed so as to taper off in the vertical direction downwards so that the emergency exit door 112, by being lowered, can be locked with positive-locking fit and/or with non-positive locking fit, as indicated by means of the arrow 134. For the purpose of unlocking, the emergency exit door 112 can be lifted and removed from the recess 114.

Figure 8A:
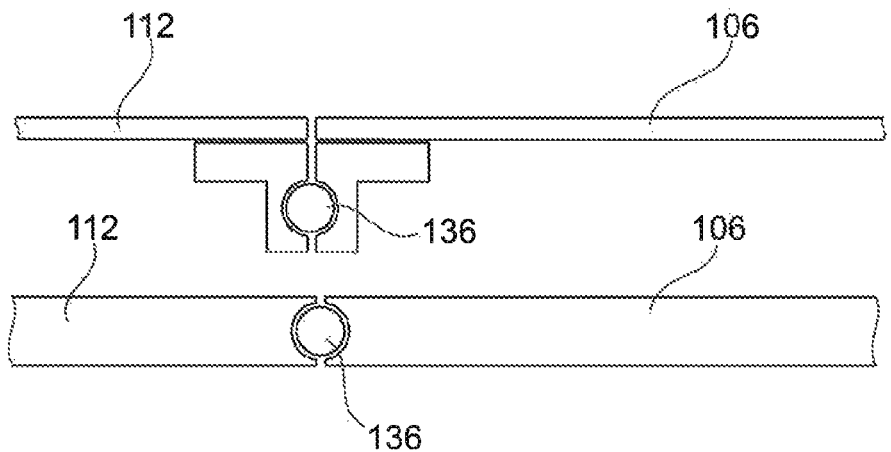
FIG. 8A shows a section of part of an emergency exit door for a passenger aircraft according to one exemplary embodiment.

FIG. 8A shows a section of part of an emergency exit door 112 and of an external skin 106, wherein between an edge of the emergency exit door 112 and the external skin 106 a positive-locking element 136 is arranged that is designed to detachably affix the emergency exit door 112 with positive-locking fit to the external skin 106. The positive-locking element 136 can, for example, be an elastic hose, for example of rubber material or silicon. For the purpose of locking, the positive-locking element 136 can be jammed between the emergency exit door 112 and the external skin 106, and for the purpose of opening the emergency exit door 112 it can be pulled out. The positive-locking element 136 can also be designed to be inflatable and can be pressurized in the locked state. For the purpose of opening the emergency exit door 112 in this case the pressure can be released, for example by means of a valve or a wire laminated in the positive-locking element 136, which wire can be pulled out.

Figure 8B:
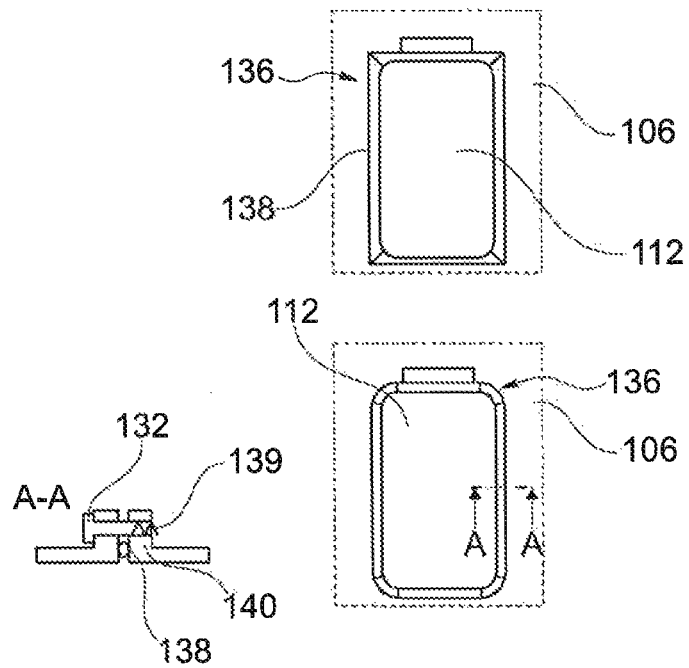
FIG. 8B shows an emergency exit door for a passenger aircraft according to another exemplary embodiment.

The positive-locking element 136 can also be designed, for example, in the form of several at least partly circumferential metal strips 138, as is shown in FIG. 8B. The metal strips 138 can cover an edge region of the emergency exit door 112 and an adjoining region of the external skin 106, and/or can be arranged with positive-locking fit between the emergency exit door 112 and the skin 106. For the purpose of opening the emergency exit door 112 the metal strips 138 can be pulled out. In addition, safety bolts 132 can be resiliently held in a receiving device 140 of the external skin 106 with a spring element 139 wherein in this arrangement they can be affixed to the emergency exit door 112 on an end opposite the spring element 139. This is shown in the detailed view of section A-A in FIG. 8B.

Figure 9:
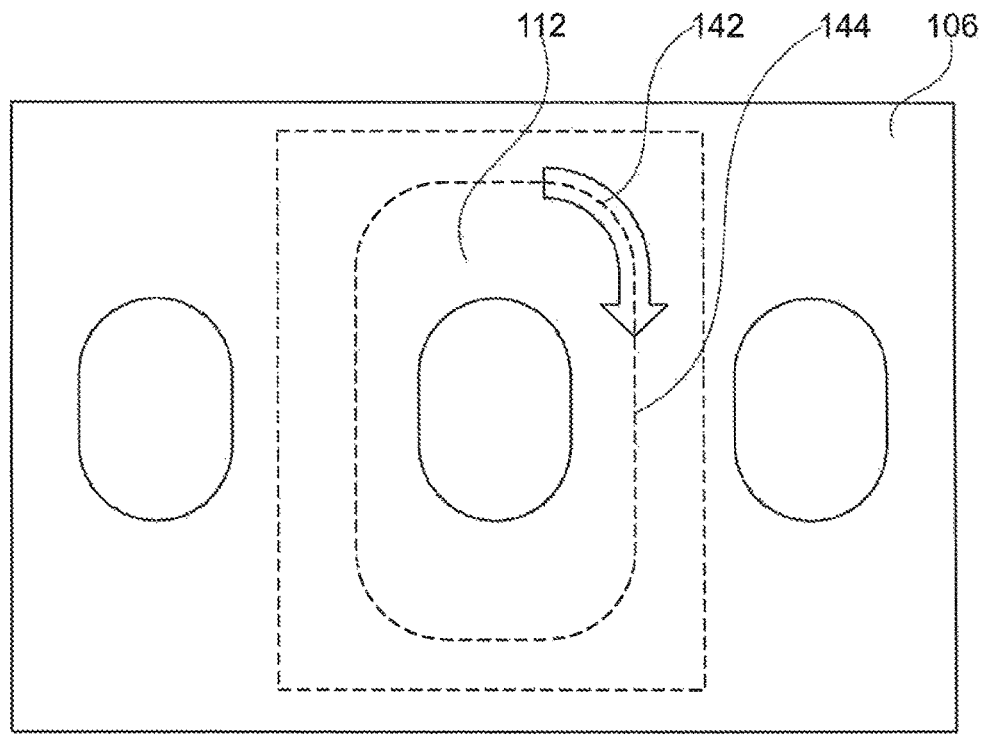
FIG. 9 shows an emergency exit door for a passenger aircraft an exemplary embodiment.

FIG. 9 shows an emergency exit door 112 for a passenger aircraft 100 according to a further exemplary embodiment. In this arrangement the emergency exit door 112 forms part of the external skin 106 and can be opened by disconnecting an integral connection 144 between the external skin 106 and the emergency exit door 112. The integral connection 144 can be designed to be circumferential and, for example, to be in the form of a predetermined breaking point that can, for example, be separated with the application of force, with a laser, a saw or a water cutter. For example, in order to establish the connection 144, part of the external skin 106, which can comprise carbon fiber composite material and/or essentially aluminum, can be removed with a laser or a water cutter so that the predetermined breaking point results. The connection 144 can also be sealed in order to avoid the presence of sharp edges.

Figure 10:
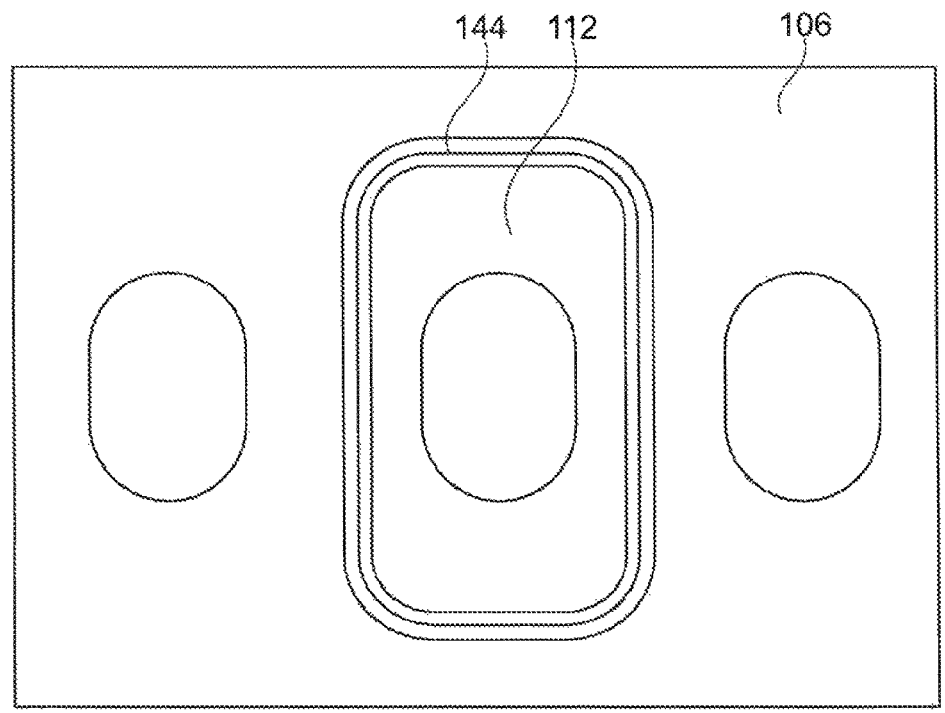
FIG. 10 shows an emergency exit door for a passenger aircraft an exemplary embodiment.

FIG. 10 shows an emergency exit door 112 for a passenger aircraft 100 according to a further exemplary embodiment in that the emergency exit door 112 is connected, for example bonded or welded, to the external skin by means of an integral connection 144. For the purpose of opening the emergency exit door 112 the positive-locking connection 144 can be destroyed or disconnected.

Figure 11:
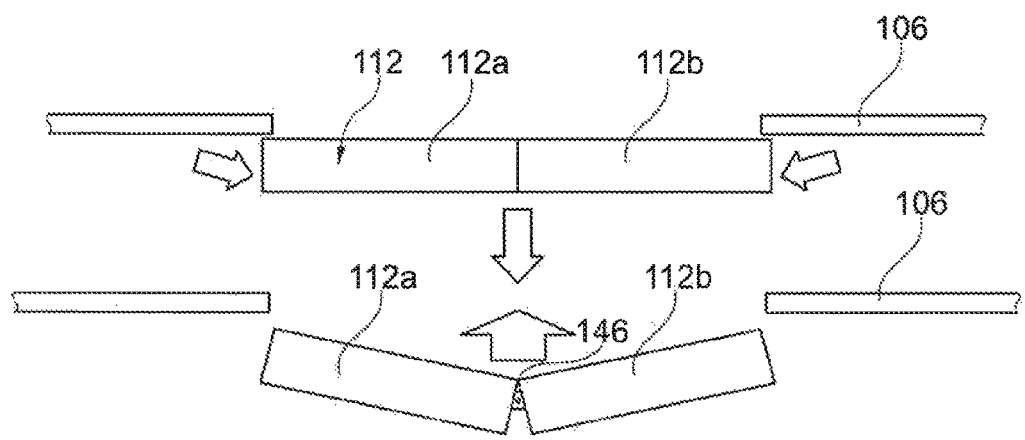
FIG. 11 shows a section of an emergency exit door for a passenger aircraft an exemplary embodiment.

FIG. 11 shows an emergency exit door 112 for a passenger aircraft 100 according to a further exemplary embodiment. The emergency exit door 112 comprises a hinge 146 and is designed to be hingeable. In addition, the emergency exit door 112 can be segmented, comprising several segments 112a, 112b. For the purpose of opening the emergency exit door 112 the segments 112a, 112b can be hinged relative to each other by way of the hinge 146, for example hinged inwards into a passenger cabin 102 of the passenger aircraft 100, as shown in FIG. 11.

Figure 12:
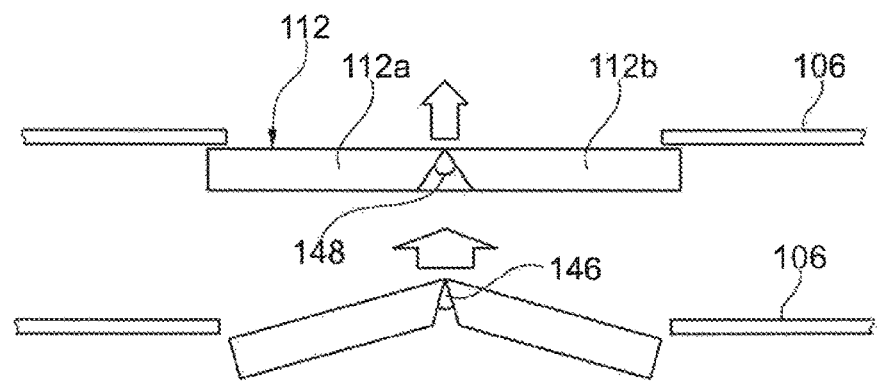
FIG. 12 shows a section of an emergency exit door for a passenger aircraft an exemplary embodiment.

FIG. 12 shows an emergency exit door 112 for a passenger aircraft 100 according to a further exemplary embodiment, wherein in contrast to the embodiment of FIG. 11 the emergency exit door 112 can be hinged outwards. To this effect the segments 112a, 112b of the emergency exit door 112 can be wedged relative to each other by means of a wedge element 148 for locking the emergency exit door 112. For the purpose of opening the emergency exit door 112 the wedge element 148 can be removed so that the emergency exit door 112 can be hinged outwards.

Figure 13:
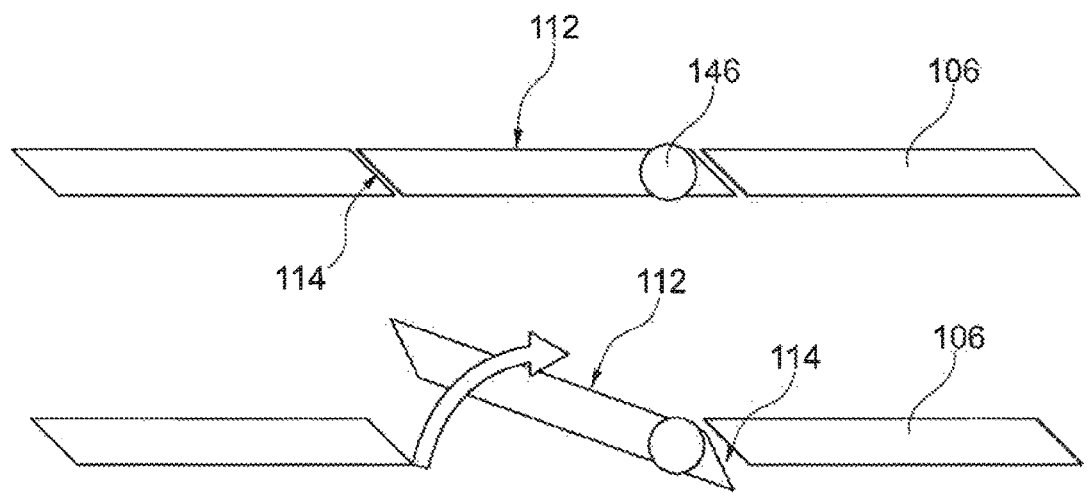
FIG. 13 shows a section of an emergency exit door for a passenger aircraft according to a still further exemplary embodiment.

FIG. 13 shows an emergency exit door 112 for a passenger aircraft 100 according to a further exemplary embodiment. In this arrangement the emergency exit door 112 comprises a trapezoidal design and by way of a hinge 146 is held in a cooperating recess 114 of the external skin 106. In the closed state the emergency exit door 112 can thus be accommodated with positive-locking fit in the receiving device 114.

Figure 14A:
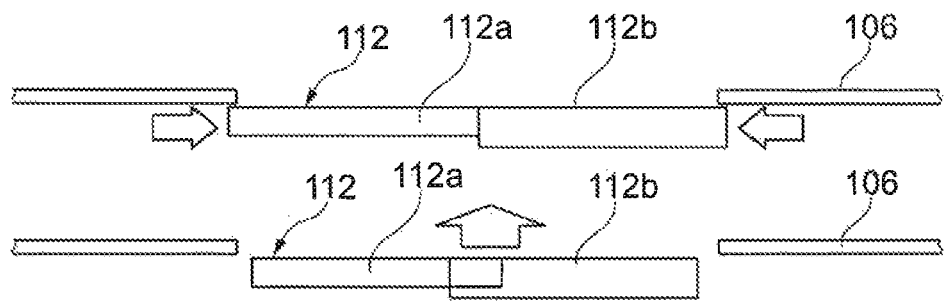
FIG. 14A shows a section of an emergency exit door for a passenger aircraft an exemplary embodiment.
Figure 14B:
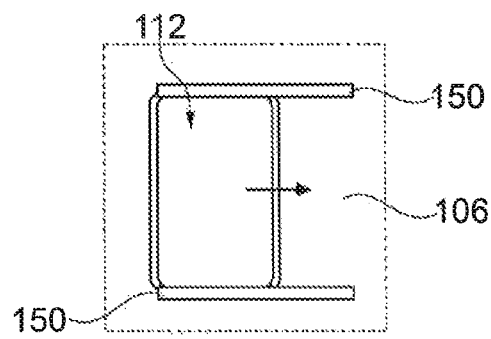
FIG. 14B shows an emergency exit door for a passenger aircraft according to a further exemplary embodiment.
Figure 14C:
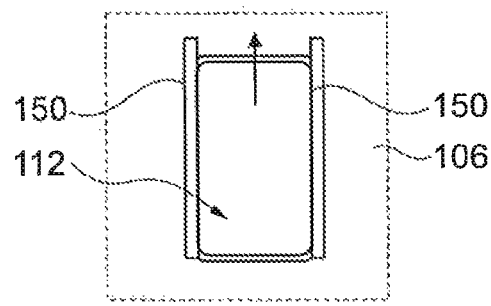
FIG. 14C shows an emergency exit door for a passenger aircraft according to a still further exemplary embodiment.
Figure 14D:
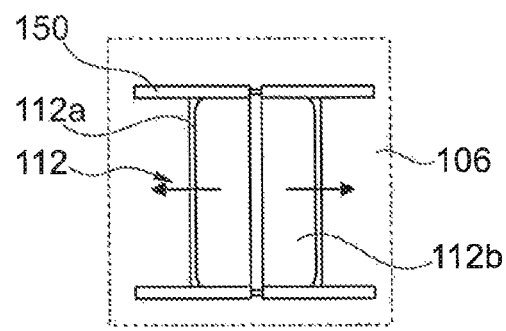
FIG. 14D shows an emergency exit door for a passenger aircraft according to a still further exemplary embodiment.

FIGS. 14A to 14D each shows an emergency exit door 112 for a passenger aircraft 100 according to embodiments, wherein FIG. 14A shows a top view, and FIGS. 14B to 14D each shows a front view. In the embodiments shown, the emergency exit door 112 is in each case designed to be slidable.

As shown in FIGS. 14A and 14D, the emergency exit door 112 can comprise a segmented design, wherein, for example, for the purpose of opening and closing, two segments 112a, 112b can be slid relative to each other in the horizontal direction. To this effect the emergency exit door 112 can be slidably held, for example, in at least one bearing arrangement 150. Furthermore, the emergency exit door 112 can be designed in one piece and can be horizontally slidable, as shown in FIG. 14B, or vertically slidable, as shown in FIG. 14C.

Figure 15A:
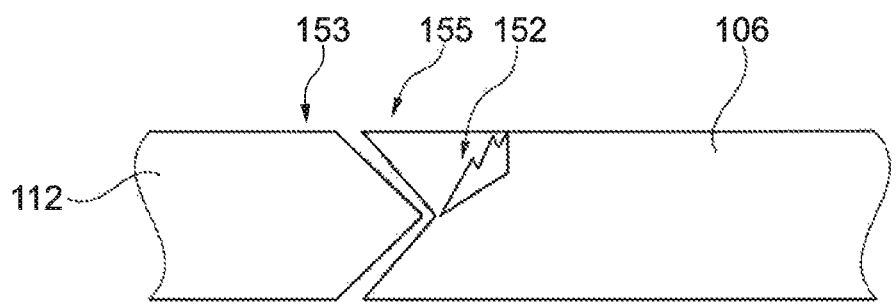
FIG. 15A shows a section of part of an emergency exit door for a passenger aircraft according to one exemplary embodiment.
Figure 15B:
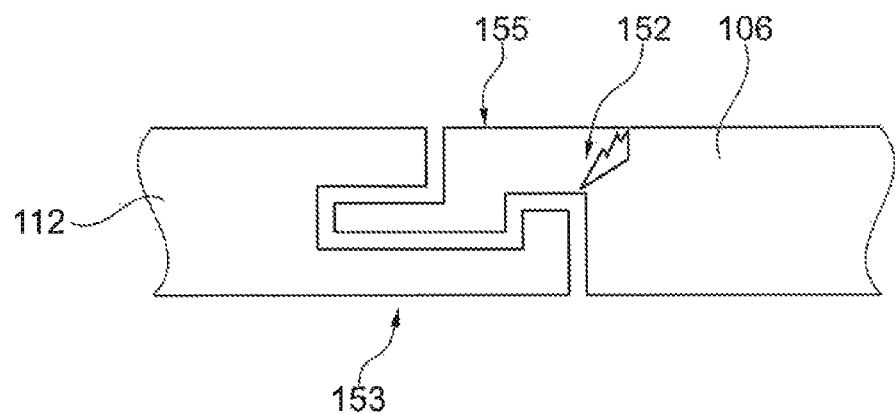
FIG. 15B shows a section of part of an emergency exit door for a passenger aircraft according to a further exemplary embodiment.

FIGS. 15A and 15B each shows an emergency exit door 112 for a passenger aircraft 100 according to exemplary embodiments. In both exemplary embodiments in each case a boundary 153 of the emergency exit door 112 and a boundary 155 of the external skin 106, which boundary 155 adjoins the emergency exit door 112, are designed so as to cooperate with each other in such a manner that in the closed state the emergency exit door 112 can be firmly anchored in the external skin 106. For the purpose of opening the emergency exit door 112 in each case part of the adjoining boundary 153 of the external skin 106 is broken at a predetermined breaking point 152 and/or is at least partly deformed. Furthermore, at least part of the boundary 153 of the emergency exit door 112 can comprise a predetermined breaking point 152.

As shown in FIG. 15A, the boundary 153 of the emergency exit door 112 at least in a sub-region can be designed in the form of a double wedge or in the form of an arrow and can engage a correspondingly designed recess or notch of the adjoining boundary 155 of the external skin 106 so that the emergency exit door 112 can be affixed.

As shown in FIG. 15B, the boundary 153 of the emergency exit door 112 can comprise a recess for receiving a projection of the boundary 155 of the external skin 106 and a projection that can be accommodated in a corresponding receiving device of the boundary 155 of the external skin 106 when the emergency exit door 112 is closed. For the purpose of opening the emergency exit door 112, for example, the projection of the boundary 155 of the external skin 106 and/or the projection of the boundary 153 of the emergency exit door 112 can be broken at a predetermined breaking point 152.

Figure 16:
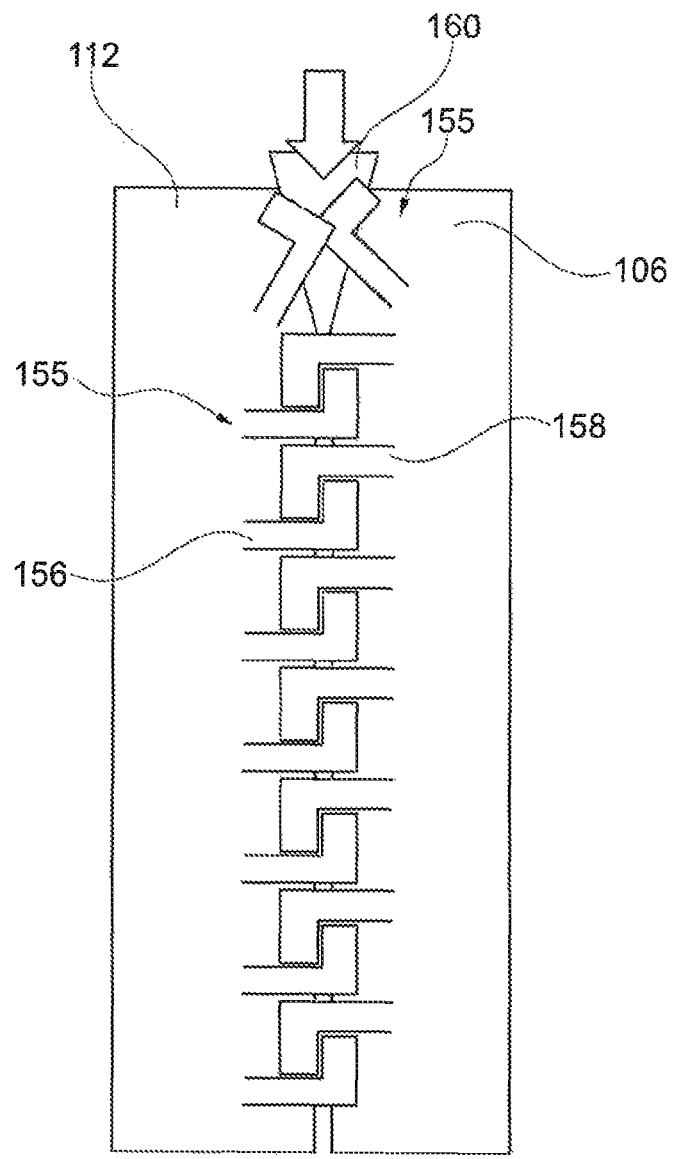
FIG. 16 shows part of an emergency exit door for a passenger aircraft according to one exemplary embodiment.

FIG. 16 shows an emergency exit door 112 for a passenger aircraft 100 according to a further exemplary embodiment. For the purpose of locking, the boundary 153 of the emergency exit door 112 can comprise hook-shaped extensions 156 that can be hooked to cooperating hook-shaped extensions 158 of the boundary 155 of the external skin 106. The extensions 156, 158 can, for example, comprise an L-shaped design. For the purpose of undoing the connection of the emergency exit door 112 with the external skin 106 it is possible, for example, to drive a wedge 160 between the extensions 156, 158 so that the extensions 156, 158 can at least partly be deformed and/or broken.

Figure 17:
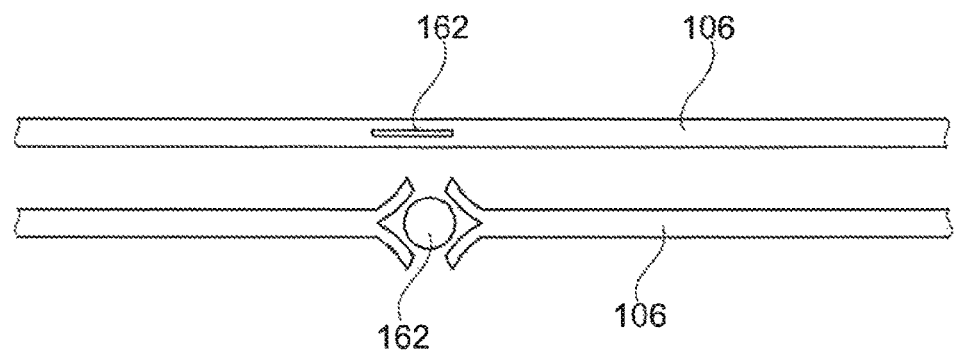
FIG. 17 shows a section of an emergency exit door for a passenger aircraft according to an exemplary embodiment.

FIG. 17 shows an emergency exit door 112 for a passenger aircraft 100 according to a further exemplary embodiment. In this embodiment the emergency exit door 112 forms part of the external skin 106, wherein at least partly circumferential on the emergency exit door 112 a separator element 162 is integrated, for example laminated, in the external skin 106. For the purpose of opening the emergency exit door 112 or in order to provide an emergency exit, the separator element 162 can, for example, be inflated or pressurized. To this effect the separator element 162 can, for example, be a hose laminated into the external skin 106. Likewise, the separator element 162 can, for example, be a cutting wire laminated into the external skin 106, by means of which cutting wire the emergency exit door 112 can, if required, be irreversibly cut from the external skin 106.

Figure 18A:
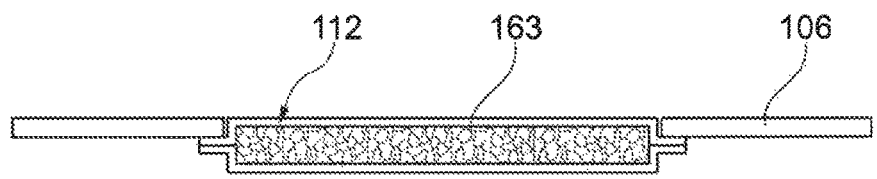
FIG. 18A shows a section of an emergency exit door for a passenger aircraft according to an exemplary embodiment.
Figure 18B:
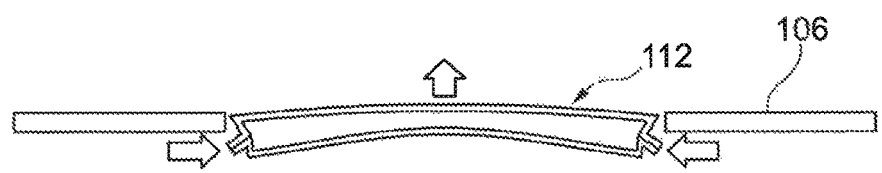
FIG. 18B shows a section of an emergency exit door for a passenger aircraft according to an exemplary embodiment.

FIGS. 18A and 18B each shows an emergency exit door 112 for a passenger aircraft 100 according to one embodiment, wherein the emergency exit door 112 can be opened as a result of deformation and/or destabilization of a structure of the emergency exit door 112. For example, as shown in FIG. 18A, the emergency exit door 112 can comprise a honeycomb core 163 and/or a sandwich structure that as a result of the action of force, for example the kicking-in of the emergency exit door 112, allows such strong deformation of the emergency exit door 112 that it can be detached from the external skin 106, as shown in FIG. 18B. Destabilization or deformation of the emergency exit door 112 can also be implemented chemically, for example as a result of the introduction of an acid into an interior volume of the emergency exit door 112.

Figure 19:
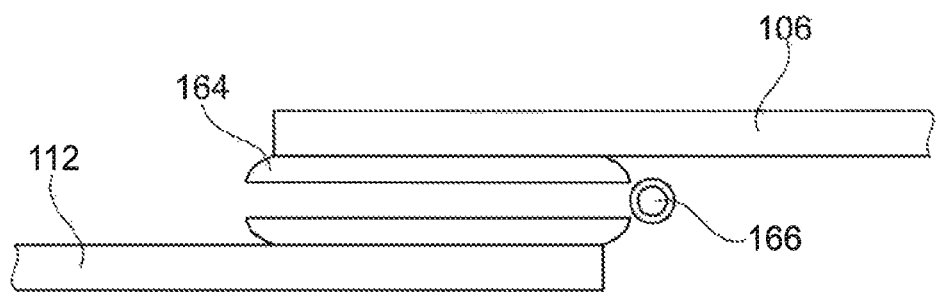
FIG. 19 shows a section of part of an emergency exit door for a passenger aircraft according to one exemplary embodiment.

FIG. 19 shows part of an emergency exit door 112 for a passenger aircraft 100 according to a further exemplary embodiment. In this arrangement the emergency exit door 112 is at least partly, by way of an integral connection 164, connected to the external skin 106. The integral connection 164 can, for example, be a bonded connection or a welded connection. For the purpose of disconnecting the integral connection 164, and thus for the purpose of opening the emergency exit door 112, the integral connection 164 can, for example, be irreversibly disconnected with the use of a heating wire 166 that can be fed through, or integrated in, the integral connection 164.

Figure 20:
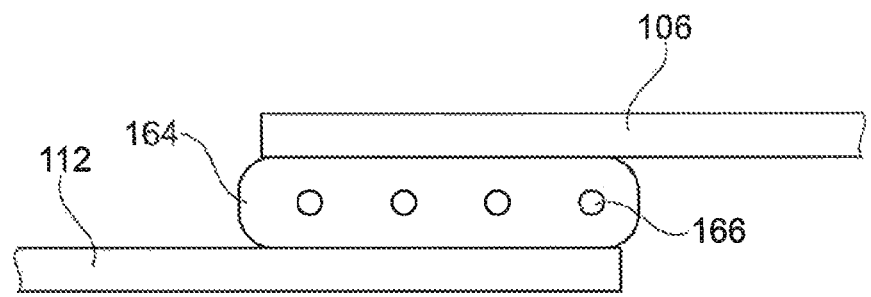
FIG. 20 shows a section of part of an emergency exit door for a passenger aircraft according to a further exemplary embodiment.

FIG. 20 shows part of an emergency exit door 112 for a passenger aircraft 100 according to a further exemplary embodiment, in which fibers 166 are integrated in the integral connection 164. The integral connection 164 between the emergency exit door 112 and the external skin 106 can, for example, be mechanically disconnected as a result of traction acting on the fibers 166.

Figure 21:
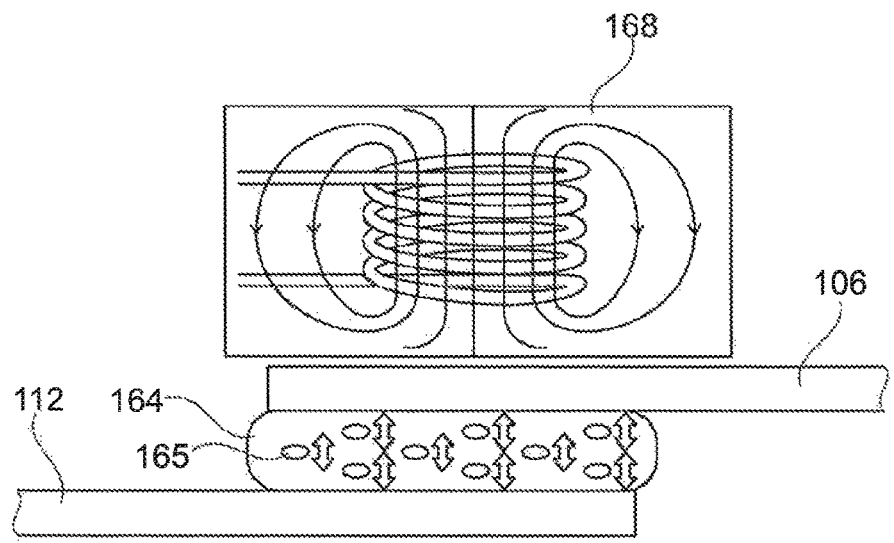
FIG. 21 shows a section of part of an emergency exit door for a passenger aircraft according to a further exemplary embodiment.

FIG. 21 shows part of an emergency exit door 112 for a passenger aircraft 100 according to a further exemplary embodiment, in which the emergency exit door 112 is at least partly connected, in an integral connection 164, to the external skin 106. The integral connection 164 can, for example, comprise metal particles and/or metal oxide particles that, by means of a magnet device 166 that can generate an alternating magnetic field, can be excited to produce oscillations, and consequently the integral connection 164 can be disconnected, for example as a result of the accompanying heat and/or as a result of the oscillations.

Figure 22:
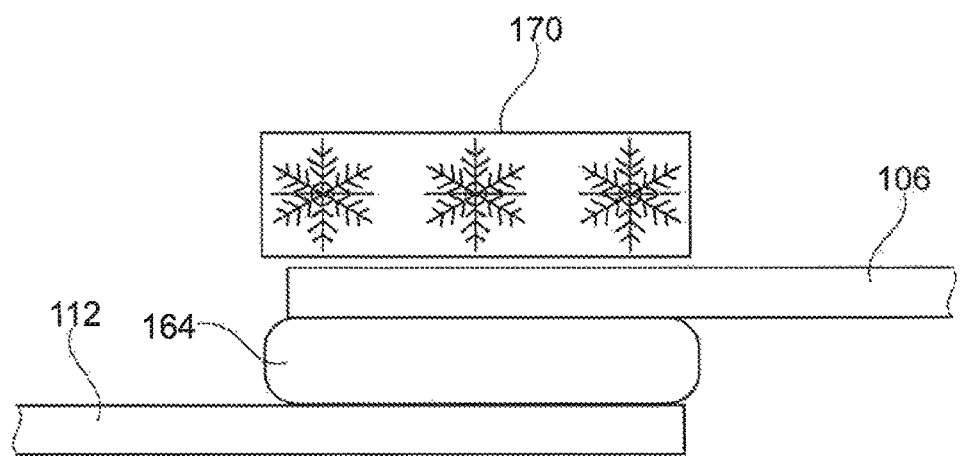
FIG. 22 shows a section of part of an emergency exit door for a passenger aircraft according to a further exemplary embodiment.

FIG. 22, likewise, shows part of an emergency exit door 112 for a passenger aircraft 100, which emergency exit door 112 is at least partly connected, in an integral connection 164, to the external skin 106. The integral connection 164 can be disconnected, for example as a result of freezing by means of a cooling device 170.

Figure 23:
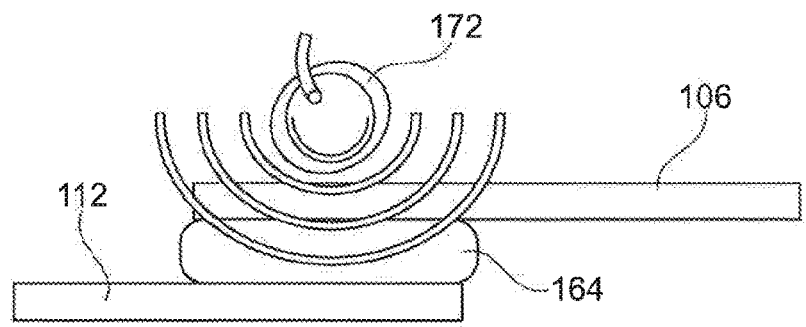
FIG. 23 shows a section of part of an emergency exit door for a passenger aircraft according to a further exemplary embodiment.

FIG. 23, likewise, shows part of an emergency exit door 112 for a passenger aircraft 100, which emergency exit door 112 is at least partly connected, in an integral connection 164, to the external skin 106. The integral connection 164 can be disconnected, for example by means of mechanical vibrations that can, for example, be generated with the use of a piezo element 172. As an alternative or in addition, the integral connection 164 can also be disconnected, for example, by means of ultrasound that can, for example, be generated with the use of a piezo element 172.

Figure 24:
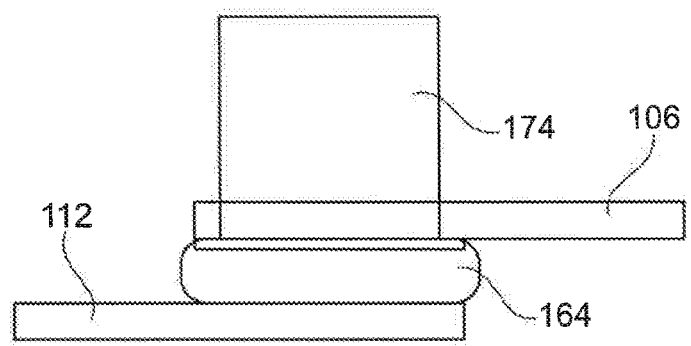
FIG. 24 shows a section of part of an emergency exit door for a passenger aircraft according to a further exemplary embodiment.

FIG. 24, likewise, shows part of an emergency exit door 112 for a passenger aircraft 100, which emergency exit door 112 is at least partly connected, in an integral connection 164, to the external skin 106. The integral connection 164 can be disconnected, for example by means of an electron beam, e.g. by absorption of the electrons and the associated heat generation in the integral connection 164.

Figure 25:
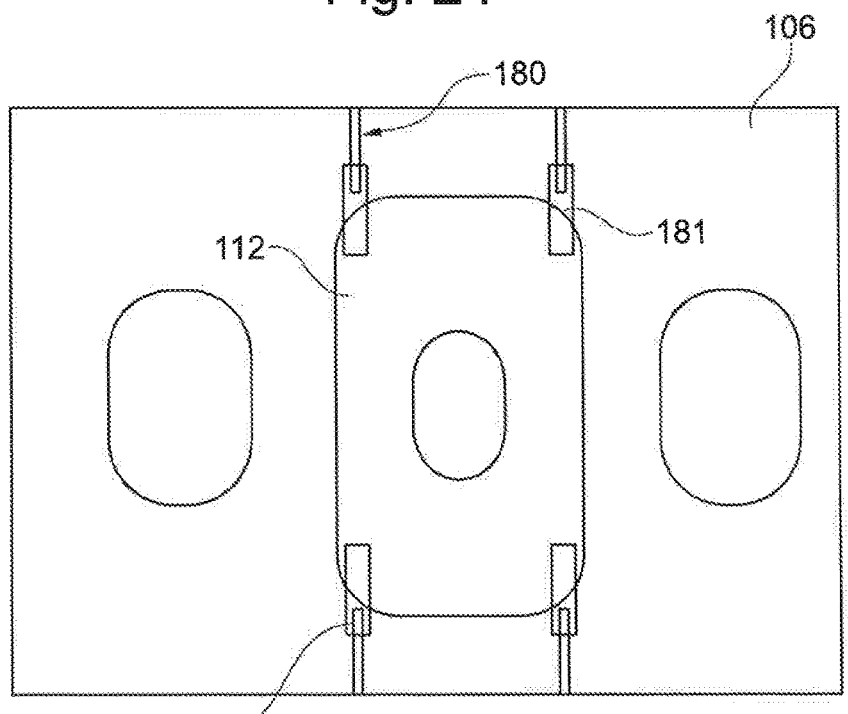
FIG. 25 shows an emergency exit door for a passenger aircraft according to a further exemplary embodiment.

FIG. 25, likewise, shows an emergency exit door 112 for a passenger aircraft 100 according to one exemplary embodiment, wherein a frame structure 180 of a fuselage of the passenger aircraft 100 is used as a door frame. The emergency exit door 112 can, for example, on the top end be attached with the use of hinges to the frame structure 180 and can be held so as to be movable or hingeable. On the bottom end the emergency exit door 112 can be detachably affixed to the frame structure 180 with the use of removable connection elements 182. For the purpose of opening the emergency exit door 112, for example, the connection elements 182 can be removed and the emergency exit door 112 can, for example, be folded upwards.

Figure 26A:
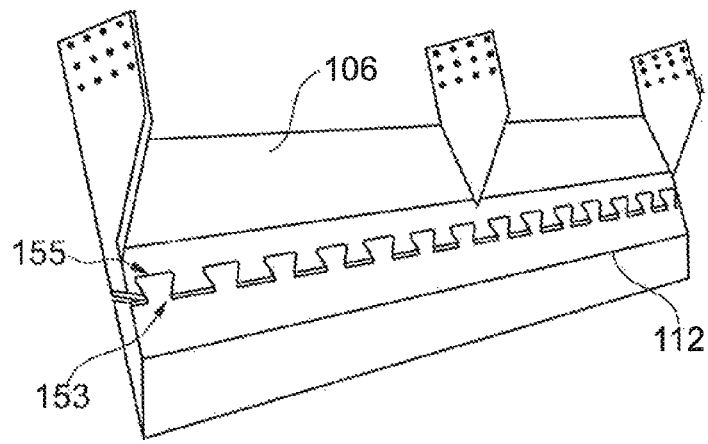
FIG. 26A shows part of an emergency exit door for a passenger aircraft according to an exemplary embodiment.
Figure 26B:
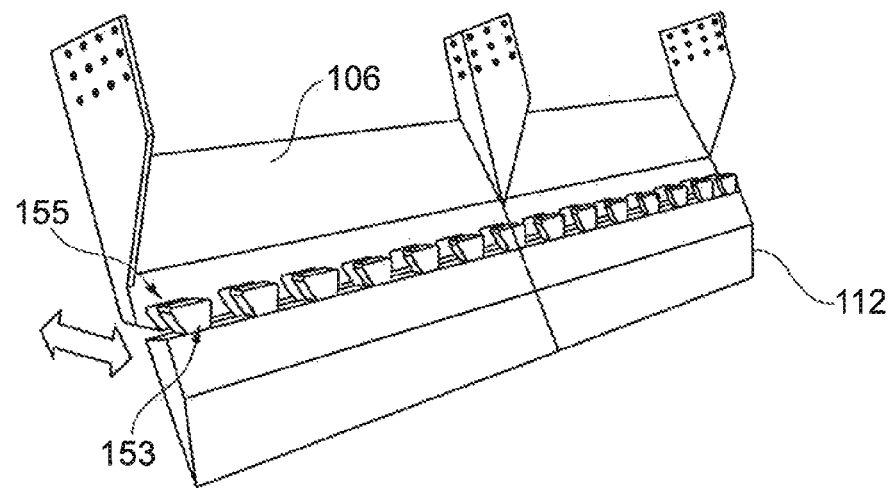
FIG. 26B shows part of an emergency exit door for a passenger aircraft according to an exemplary embodiment.

In the exemplary embodiment shown in FIGS. 26A and 26B the emergency exit door 112 at least in parts comprises a boundary 153 with dovetail extensions or projections that for the purpose of locking the emergency exit door 112 with positive-locking fit and/or with non-positive-locking fit engage cooperating recesses of a boundary 155 of the external skin 106, which boundary 155 adjoins the emergency exit door 112. The emergency exit door 112 can thus form a load-bearing region of the external skin 106, and for the purpose of opening can be pushed from the external skin 106, as is shown in FIG. 26B.

Figure 27:
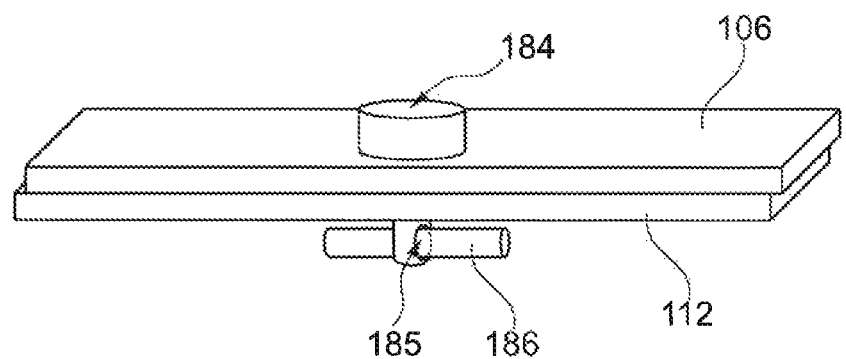
FIG. 27 shows part of an emergency exit door for a passenger aircraft according to a further exemplary embodiment.

FIG. 27 shows part of an emergency exit door 112 that is affixed to the external skin 106 by way of a rivet connection 184. To this effect, on the inside of the passenger aircraft 100 the rivet connection 184 comprises an eyelet 185 through which a locking element 186 has been slid so that the emergency exit door 112 is detachably affixed to the external skin 106. For the purpose of opening the emergency exit door 112 the locking element 186 can be removed from the eyelet 185. The emergency exit door 112 can thus be detachably affixed to the external skin 106 by means of several rivet connections 184.

Figure 28:
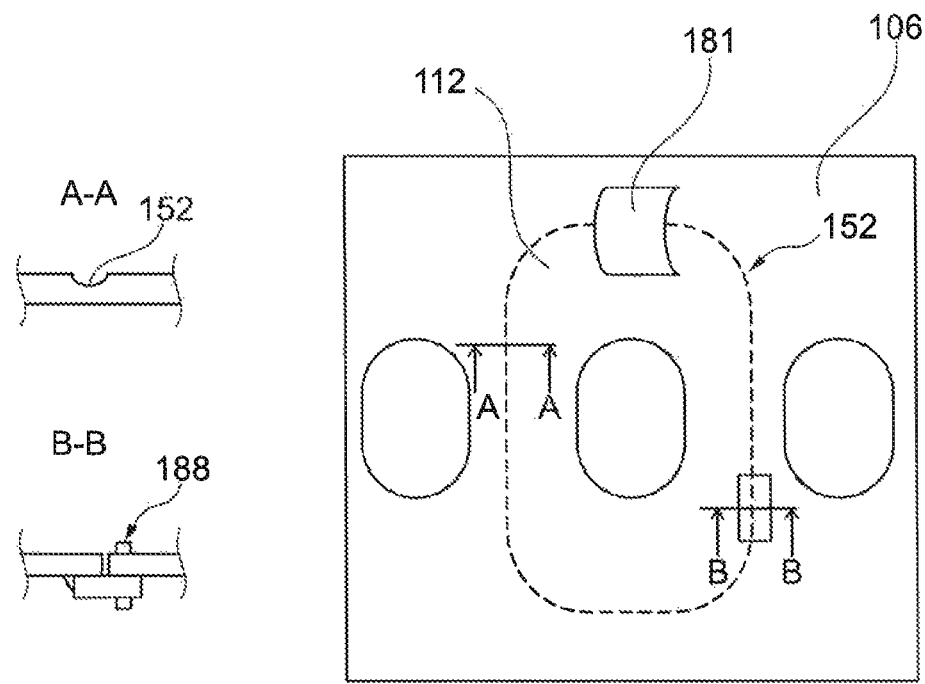
FIG. 28 shows an emergency exit door for a passenger aircraft according to an exemplary embodiment.

FIG. 28 shows an emergency exit door 112 for a passenger aircraft 100 according to a further exemplary embodiment. At the top end of the emergency exit door 112 the latter is hingeably attached to the external skin 106 by means of a hinge 181. The emergency exit door 112 can form part of the external skin 106 and/or can locally or circumferentially comprise a predetermined breaking point 152, for example in the form of a notch, as shown in sectional view A-A. As a result of breakage of the predetermined breaking point 152 the emergency exit door 112 can be separated from the external skin 106 and can be hinged upwards, by way of the hinge 181, for example with the use of a winch. As an alternative or in addition to this, the emergency exit door 112 can be connected to the external skin 106 by way of at least one doubler element 188, as shown in sectional view B-B. Moreover, several doubler elements 188 can be arranged locally or circumferential on the emergency exit door 112.

Figure 29:
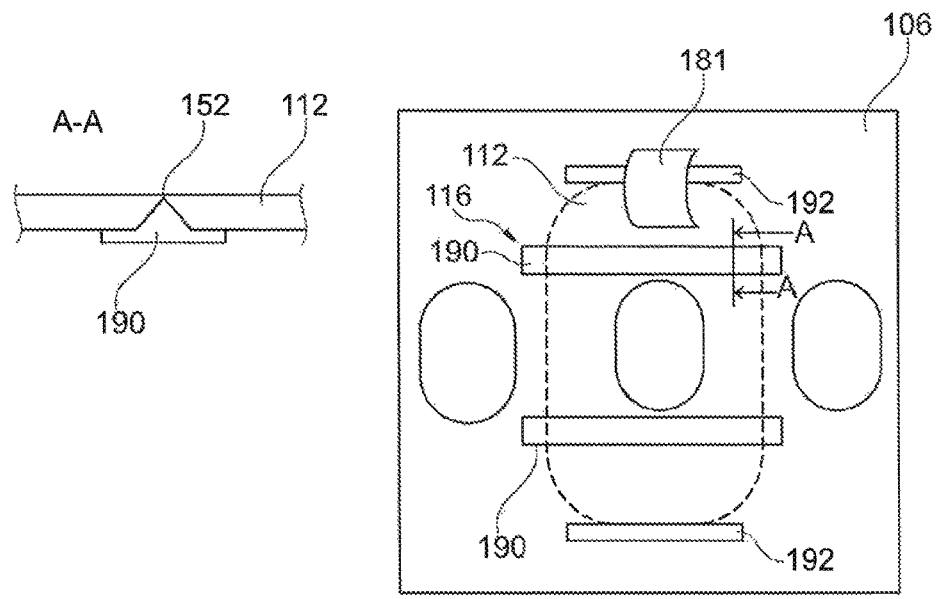
FIG. 29 shows an emergency exit door for a passenger aircraft according to a further exemplary embodiment.

FIG. 29 shows an emergency exit door 112 for a passenger aircraft 100 according to a further exemplary embodiment. In this embodiment the emergency exit door 112 on the top edge and/or on the bottom edge partly overlaps with the external skin 106 and, by way of a hinge 181, at the top end is hingeably or movably affixed to the external skin 106.

Furthermore, the emergency exit door 112 comprises a locking device 116 that comprises two splint elements 190 that can be designed to be partly flexible and/or partly triangular. The splint elements 190 cover the emergency exit door 112 in the transverse direction and are wedged in a predetermined breaking point 152 of the emergency exit door 112, as is clearly shown in the detailed view A-A.

Furthermore, in order to prevent rapid pressure loss, in each case a sheet metal strip 192 can be arranged at the top and/or at the bottom of the emergency exit door 112, which sheet metal strip 192 can at least partly cover a door gap.

For the purpose of opening the emergency exit door 112 the splint elements 190 can be removed so that the emergency exit door 112 can be stabilizable or breakable at the predetermined breaking points 152. The emergency exit door 112 can then, as a result of the action of force, be folded at the predetermined breaking points 152 and can be hinged upwards by way of the hinge 181.

Figure 30:
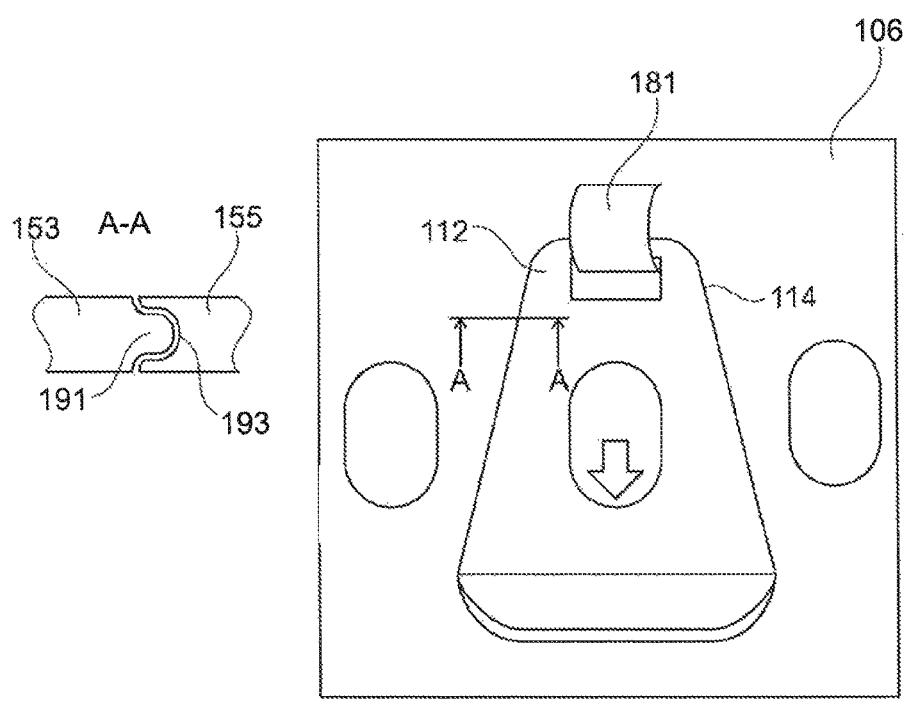
FIG. 30 shows an emergency exit door for a passenger aircraft according to a further exemplary embodiment.

FIG. 30 shows an emergency exit door 112 for a passenger aircraft 100 according to a further exemplary embodiment.

In this embodiment the emergency exit door 112 is trapezoidal in design, or in the form of an inverted V, and is arranged with positive-locking fit in a correspondingly designed recess 114 of the external skin 106, and/or is locked. Furthermore, at the top end the emergency exit door 112 is held, by means of a hinge 181, on the external skin 106 so as to be hingeable and/or movable in the vertical direction. As shown in the detailed view A-A, a boundary 153 of the emergency exit door 112 at least in a sub-region comprises a projection 191 that engages a correspondingly designed recess 193 in a boundary 155 of the external skin 106 or is accommodated in the aforesaid.

For the purpose of opening the emergency exit door 112 it can be moved downwards in the vertical direction and subsequently can be hinged upwards by way of the hinge 181.

Figure 31:
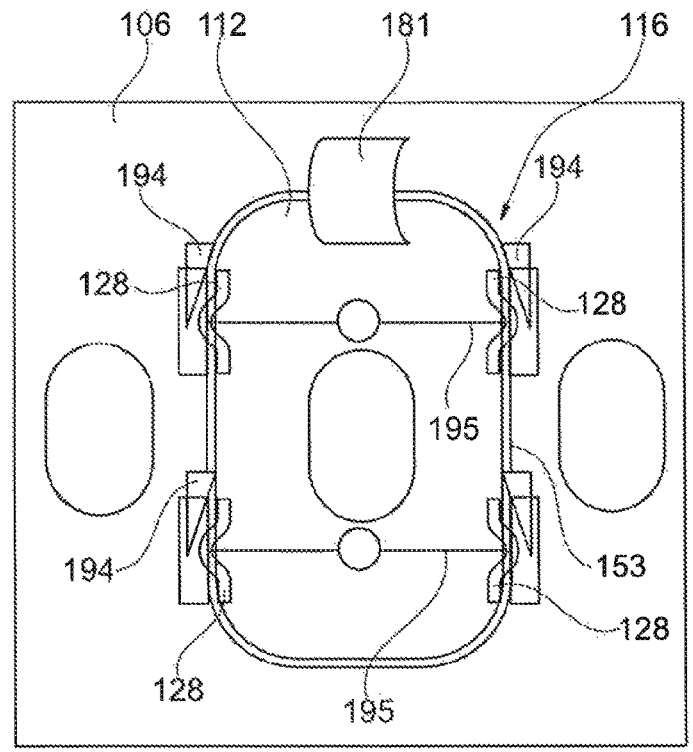
FIG. 31 shows an emergency exit door for a passenger aircraft according to a further exemplary embodiment.

FIG. 31 shows an emergency exit door 112 for a passenger aircraft 100 according to a further exemplary embodiment. At the top end the emergency exit door 112 is hingeably and/or movably held on the external skin 106 by means of a hinge 181.

The emergency exit door 112 comprises a locking device 116 that comprises a total of four spring elements 128, with in each case two being arranged on a longitudinal side of the emergency exit door 112. In each case the spring elements 128 project at least partly beyond a boundary 153 of the emergency exit door 112 and are in each case supported by a wedge element 194. Furthermore, in each case two spring elements 128, which are located opposite in the transverse direction of the emergency exit door 112, are braced by means of a lever 195.

For the purpose of locking the emergency exit door 112 the spring elements 128 can be pressed against the wedge elements 194, either in the pre-tensioned state or in the relaxed state. For the purpose of opening the emergency exit door 112 the levers 195 can be activated so that the spring elements 128 make a transition to the corresponding further state, i.e. the relaxed state or the pre-tensioned state, and the emergency exit door 112 can be hinged upwards.

Figure 32:
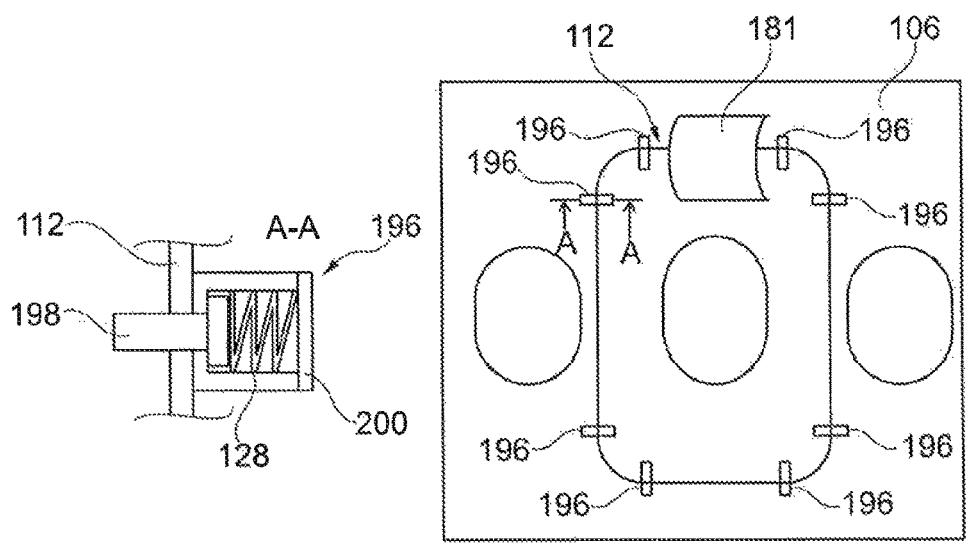
FIG. 32 shows an emergency exit door for a passenger aircraft according to a further exemplary embodiment.

FIG. 32 shows an emergency exit door 112 for a passenger aircraft 100 according to a further exemplary embodiment. At the top end the emergency exit door 112 is held, so as to be hingeable and/or movable, on the external skin 106 by means of a hinge 181.

On each side the emergency exit door 112 is affixed and/or locked to the external skin by means of two bolt devices 196 each. However, it is also possible for several bolt devices 196 to be arranged on each side. As is shown in the detailed view A-A, each of the bolt devices 196 comprises a bolt 198 that can, for example, be cylindrical or conical in shape, with one end of the bolt 198 projecting into a recess of the emergency exit door 112. By a further end, which is opposite the aforesaid end, the bolt 198 is supported on, and/or pre-tensioned to, a spring element 128, for example a flat spiral spring, a gas spring or a leaf spring. The spring element 128 in turn is supported on the external skin 106 on a removable end cap 200. Instead of the spring element 128 it is also possible to provide a pressurized container, which can, for example, comprise fluid and/or gas.

For the purpose of opening the emergency exit door 112 the end cap 200 can be removed so that the spring element 128 is relaxed, and the bolt 198 is released. The bolt 198 can subsequently be removed from the recess in the emergency exit door 112, and the emergency exit door 112 can be hinged upwards.

Figure 33A:
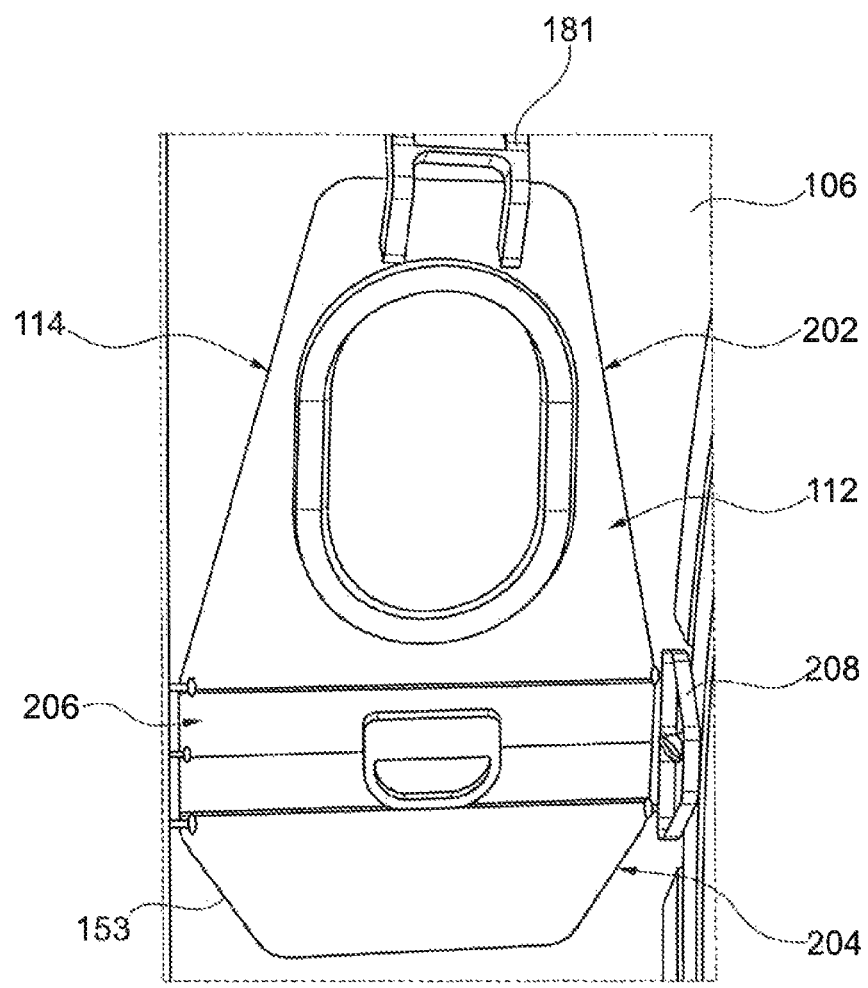
FIG. 33A shows an emergency exit door for a passenger aircraft according to a further exemplary embodiment.

FIG. 33A shows an emergency exit door 112 for a passenger aircraft 100 according to a further exemplary embodiment. At the top end the emergency exit door 112 is hingeably and/or movably held on the external skin 106 by means of a hinge 181.

In the top region 202 and in the bottom region 204 the emergency exit door 112 is trapezoidal in shape and is accommodated in a corresponding recess 114 of the external skin 106. Between the top region 202 and the bottom region 204 the emergency exit door 112 further comprises a folding region 206 that is movably held and/or accommodated in a guide rail 208.

Figure 33B:
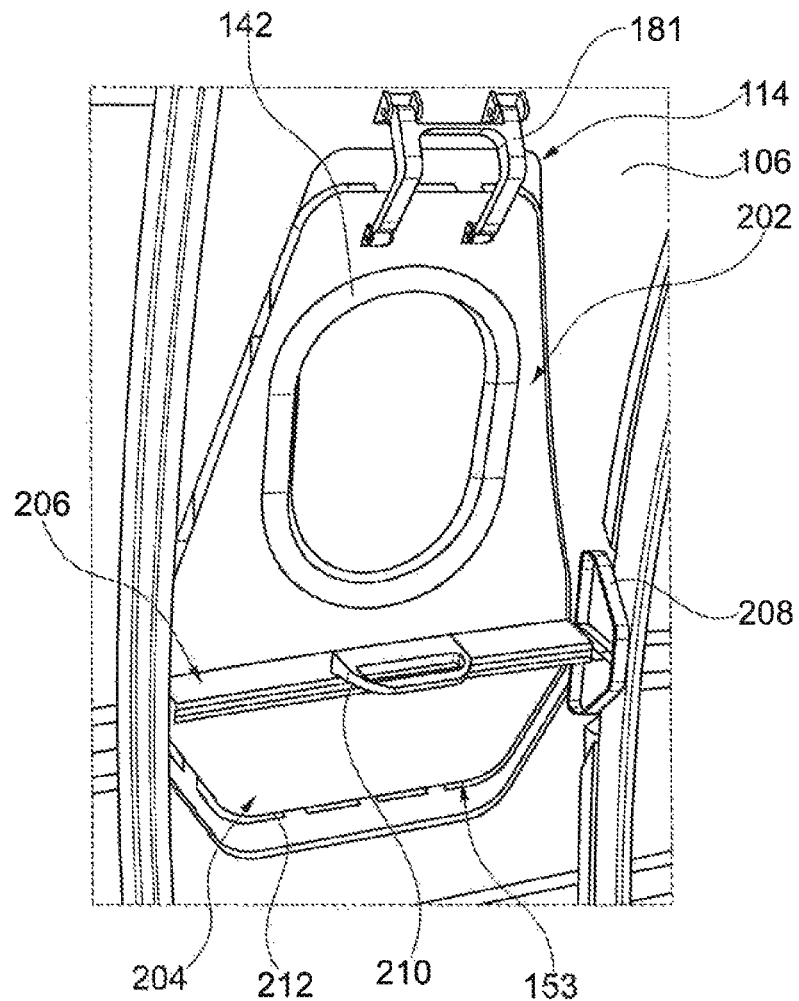
FIG. 33B shows an emergency exit door for a passenger aircraft according to a further exemplary embodiment.

FIG. 33B shows the emergency exit door 33A during an opening procedure. For the purpose of opening the emergency exit door 112 it is possible to pull a handle 210 that is arranged in the folding region 206, wherein as a result of the handle 210 being pulled, the folding region 206 can be moved forwards in the guide rail 208, so that the folding region 206 can be at least partly folded. As a result of folding the folding region 206, at the same time the upper region 202 of the emergency exit door 112 is pulled downwards in the vertical direction, and the bottom region 204 is pulled upwards in the vertical direction so that the two trapezoidal regions 202, 204 can be detached from the cooperating recess 114 of the external skin 106. The emergency exit door 112 can subsequently be hinged upwards, by way of the hinge 181, so that an emergency exit of passengers from the passenger aircraft 100 becomes possible.

For the purpose of further stabilizing the emergency exit door 112 in the recess 114 of the external skin 106, furthermore, on a boundary 153 of the emergency exit door 112 at least one spring-like projection 212 can be locally arranged that when the emergency exit door 112 is closed can be accommodated in a cooperating groove-like indentation in the external skin 106. The boundary 153 of the emergency exit door 112 can also comprise several such spring-like projections 212 or one circumferential spring-like projection 212.

FIGS. 34 to 37 show an emergency exit door 112 for a passenger aircraft 100 according to a further exemplary embodiment of the embodiment. The emergency exit door 112 is fully load carrying and comprises a hinge 213 having a hinge arm 214 by which the emergency exit door 112 is hingeably attached to an external skin 106 of an aircraft 100 that is partly shown by FIGS. 34 and 35. The hinge 213 is mounted at one side of the emergency exit door 112 so that it can be pivoted about a vertical axis v of the aircraft 100.

Further, the emergency exit door 112 comprises eight identical lock bolts 215, wherein for the purpose of clarity only one of the lock bolts 215 is provided with a reference sign in FIG. 34. Each two of the lock bolts 215 is arranged on one of four side margins of the emergency exit door 112 and frame a door cutout of the emergency exit door 112. Each of the lock bolts 215 comprises a conic part and is screwed into a nut that is shown in detail in FIGS. 41 to 43. In FIG. 34, the emergency exit door 112 is shown in a closed position in that it is locked in press fit by the bolts 215. A mechanism in form of a mechanical system 216 is arranged inside of the aircraft 100. The mechanical system 216 is adapted for unlocking the emergency door 112 by pulling the bolts 215 out of their press fits and inside of the emergency exit door 112. To this purpose the mechanical system 216 comprises a lever arrangement 218 that is shown in more detail in FIG. 36. The mechanical system 216 further comprises a hydraulic pressure actuator 217 by which the lever system 218 is actuated.

FIG. 35 shows a cross sectional view of the emergency exit door 112 as per FIG. 34 that is swung into an open position as indicated by arrow 112.1.

FIG. 36 shows the lever arrangement 218 of the mechanical system 216 in a cross sectional view along A-A of FIG. 34. The lever arrangement 218 comprises five levers 219 to 223 that are interconnected articulately with each other by three joints 224 to 226 in a star-shaped manner. Two outer levers 219 and 222 of the levers 219 to 223 are connected each with one of the bolts 215 shown on the right respectively left side of FIG. 36. A third outer lever 223 of the levers 219 to 223 is connected to the hydraulic pressure actuator 217 as per FIGS. 34 and 35. In the upper part of FIG. 36 the bolts 215 are in their press fits, which are shown in detail in FIGS. 41 to 43—while in the lower part of FIG. 36 the bolts 215 are pulled out of their press fits. To pull the bolts 215 out of their press fits the hydraulic pressure actuator 217 pulls the third outer lever 223 that leads to a movement of the other levers 219 to 222 that forces the bolts 215 to move out of their press fits. By this the hydraulic pressure actuator 1 is supporting an opening of the emergency exit door 112.

FIG. 37 shows a sectional view along B-B in FIG. 34 of the hinge 213 that has an almost rectangular shaped hinge arm 214. At two ends of the hinge arm 214 a joint 227 respectively 228 is provided by that the emergency exit door 112 is hingeably attached to the hinge arm 214 and the external skin 106. After pulling the bolts 215 out of their press fits (FIG. 36) the emergency exit door 112 can be swung in directions as indicated by arrows 229 and 230 as shown by the upper and the middle part of FIG. 37 and be brought into an open position that is shown in the lower part of FIG. 37.

FIG. 38 shows that the bolts 215 with their conical parts can also be arranged in opposite direction as shown in FIGS. 34 to 37 and be pushed out of their press fits by a medium 231, e.g. compressed air or hydraulics, wherein the pushing direction is indicated by double arrow 232.

FIGS. 39 and 40 show another emergency exit door 112 for a passenger aircraft 100 according to a further exemplary embodiment of the embodiment that mainly differs from the embodiment as per FIGS. 34 to 37 in the arrangement of the hinge 213 that is mounted at one side of the emergency exit door 112 so that it can be pivoted about a horizontal axis h of the aircraft 100 as indicated by arrow 213.1 in FIG. 40.

As it is shown by FIG. 40, a hydraulic cylinder 214.1 is hingeably fixed to the outer skin 106 of the aircraft 100. The hydraulic cylinder 214.1 was also hingeably and easily detachably fixed to the emergency exit door 112 and has pushed the latter from its closed position as shown by FIG. 39 in the direction of its open position. After reaching its maximum hub the hydraulic cylinder 214.1 has been detached from the emergency exit door 112. By this the hydraulic cylinder 214.1 is supporting an opening of the emergency exit door 112.

FIG. 41 shows detail Z of FIG. 36. The bolt 215 comprises a conic part 233 and a cylindrical part 234 with a thread 235. The conic part 233 is arranged in a press fit manner in respective fitting apertures of the emergency exit door 112 and the external skin 106. The cylindrical part 234 is screwed with its thread 235 into an anchor nut 236 that is fixed to the external skin 106. This screw connection leads to a pre-tension of the bolt 215 and prevents a slip-out of the bolts 215 in case of vibrations. A splint 237 further fixes the bolt 215 to the anchor nut 236. An explosive charge 238 is arranged at the cylindrical part 234 of the bolt 215 and adapted for destroying the bolts 215 at the cylindrical part 234 as a predetermined breaking point. Alternatively, the emergency exit door 112 can comprise at least two independent explosive charges 238 at independent ignition circuits (not shown). Further the ignition of the explosive charge 238 is secured via a not shown barometric control.

FIG. 42 shows the detail Z of FIG. 36 after the explosive charge 238 has been exploded. As a result of the explosion the bolt 215 has been divided into the cylindrical part 234 and the rest of the bolt 215 that can be pulled by the mechanical system 216 (FIGS. 34 to 37) out of the press fit as indicated by arrow 239.

FIG. 43 shows detail Z of FIG. 36 after the rest of the bolt 215 has been pulled out of the press fit. The emergency exit door 112 now can be opened as indicated by arrow 240.

The embodiment shown by FIG. 44 differs from the embodiment shown by FIGS. 41 to 43 in that the bolt 215 comprises a non-conic form-fit part 241 that is arranged in a press fit manner in a respective aperture of the external skin 106.

Figure 45:
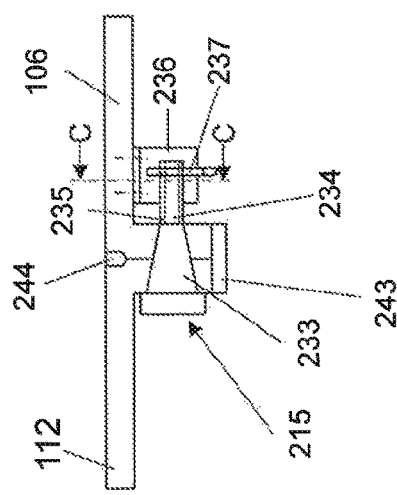
FIG. 45 shows alternative conical bolts and other elements for the emergency exit door as per FIGS. 34 to 37.
Figure 47:
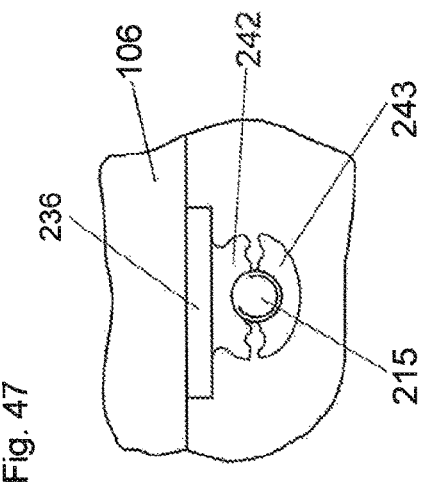
FIG. 47 shows a cross sectional views across C-C along FIG. 45 with a deactivated respectively an activated explosive charge.
Figure 46:
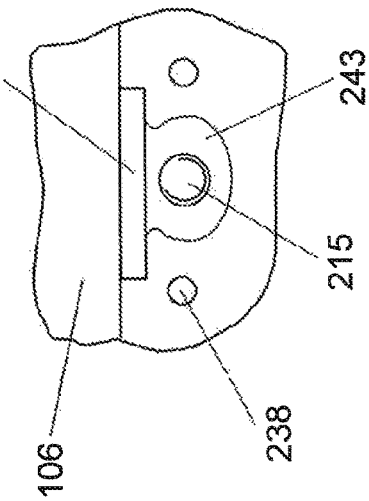
FIG. 46 shows a cross sectional views across C-C along FIG. 45 with a deactivated respectively an activated explosive charge.

The embodiment shown by FIGS. 45 to 47 differs from the embodiment shown by FIGS. 41 to 43 in that a pyrotechnic system as an explosive charge 238 is arranged inside the anchor nut 236 and adapted for destroying the anchor nut 236 as a predetermined breaking point. FIG. 47 shows that the anchor nut has been divided into an upper part 242 and a lower part 243 after the explosion of the pyrotechnic system.

Figure 48:
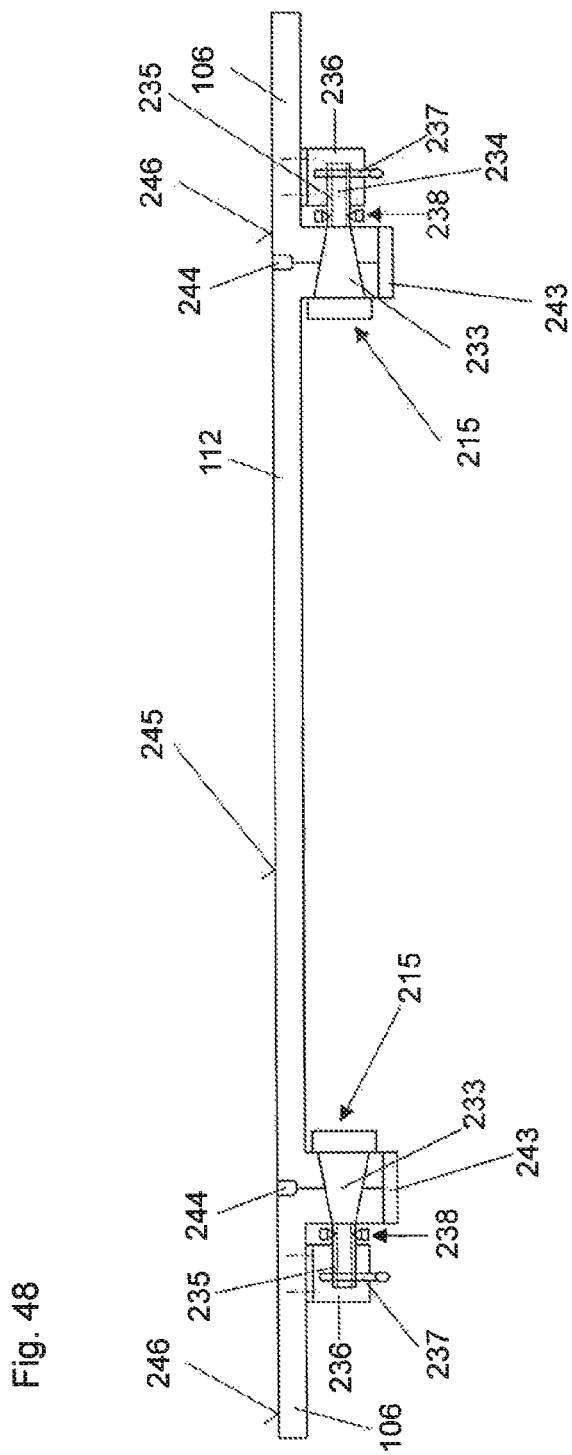
FIG. 48 shows a cross sectional view of an emergency exit door lockable by conical bolts for a passenger aircraft according to another exemplary embodiment.

FIG. 48 shows that the emergency exit door 112 comprises a rubber lip 243 with circumferential profile that is adapted for providing inner pressure tightness of the emergency exit door 112. Further two silicone sealants 244 are arranged each between two adjacent outer surfaces 245 respectively 246 of the emergency exit door 112 and the external skin 106. Such a lip 243 and sealants 244 are also shown in the embodiments as per FIGS. 41 to 45.

In addition, it should be pointed out that "comprising" does not exclude other elements, and "a" or "an" does not exclude a plural number. Furthermore, it should be pointed out that characteristics or steps that have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A passenger aircraft with a passenger cabin, comprising:
    a fully functional door that is openable and closable and that is designed for the entry and exit of passengers; and
    an emergency exit door that is designed exclusively for the emergency exit of passengers from the passenger cabin;
    wherein the emergency exit door is arranged in a region of an external skin of the passenger aircraft, which region is arranged forward or aft of wings of the passenger aircraft,
    wherein the emergency exit door is locked by press fit bolts, each comprising a conic part that fits into a respective conical hole extending through the emergency exit door and the external skin,
wherein the bolts are insertable into and removable from their respective conical holes through a lever arrangement in the emergency exit door, and
wherein the bolts frame a door cutout of the emergency exit door.

2. The passenger aircraft of claim 1,
wherein the emergency exit door is designed to be load bearing.

3. The passenger aircraft of claim 1,
wherein the emergency exit door is reversibly openable.

4. The passenger aircraft of claim 1,
wherein the press fit bolts are designed to detachably affix the emergency exit door to the external skin of the passenger aircraft.

5. The passenger aircraft of claim 1,
wherein the emergency exit door is detachably affixed with positive-locking fit in the external skin of the passenger aircraft.

6. The passenger aircraft of claim 1,
wherein the bolts are screwed into nuts.

7. The passenger aircraft of claim 6,
wherein the emergency exit door comprises at least one explosive charge which is adapted for destroying the bolts or the nuts each at a predetermined breaking point.

8. The passenger aircraft of claim 1,
wherein the bolts comprise a non-conic form-fit part.

9. The passenger aircraft of claim 7,
wherein the emergency exit door comprises a barometric control which is adapted for securing the ignition of the at least one explosive charge.

10. The passenger aircraft of claim 1,
wherein an amplified device is adapted for supporting an opening of the emergency exit door.

* * * * *